(12) United States Patent
Walker et al.

(10) Patent No.: US 9,136,958 B2
(45) Date of Patent: Sep. 15, 2015

(54) METHODS AND APPARATUS FOR PROVIDING HYBRID UNICAST BROADCAST SERVICES

(71) Applicant: QUALCOMM Incorporated, San Diego, CA (US)

(72) Inventors: Gordon Kent Walker, Poway, CA (US); Charles N. Lo, San Diego, CA (US); Chaitali Gupta, San Diego, CA (US); Matthew Stuart Grob, La Jolla, CA (US); Nagaraju Naik, San Diego, CA (US); Jun Wang, San Diego, CA (US); Michael G. Luby, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 13/802,651

(22) Filed: Mar. 13, 2013

(65) Prior Publication Data

US 2013/0344798 A1   Dec. 26, 2013

Related U.S. Application Data

(60) Provisional application No. 61/663,521, filed on Jun. 22, 2012.

(51) Int. Cl.
  *H04H 20/71* (2008.01)
  *H04H 20/38* (2008.01)
  *H04L 29/06* (2006.01)

(52) U.S. Cl.
  CPC .......... *H04H 20/38* (2013.01); *H04L 63/0428* (2013.01)

(58) Field of Classification Search
  USPC ............ 455/3.01–3.06, 414.1–414.3; 715/22, 715/25, 31, 37, 38–41, 44, 52, 54, 56, 715/60–63, 86–89
  See application file for complete search history.

(56) References Cited

U.S. PATENT DOCUMENTS

| 6,057,847 | A  | 5/2000 | Jenkins |
| 7,548,948 | B2 | 6/2009 | Klemets et al. |
| 7,697,557 | B2 | 4/2010 | Segel |
| 2002/0006116 | A1 | 1/2002 | Burkhart |

(Continued)

OTHER PUBLICATIONS

ATSC: "ATSC Standard: Non-Real-Time Content Delivery," May 9, 2012, XP055080401, Retrieved from the Internet < URL: http://www.atsc.org/cms/standards/a_103-2012.pdf >, [retrieved on Sep. 20, 2013], 138 pages.

(Continued)

*Primary Examiner* — Fayyaz Alam
(74) *Attorney, Agent, or Firm* — Ryan N. Farr

(57) ABSTRACT

A method, an apparatus, and a computer program product are provided in connection with facilitating hybrid unicast/broadcast service distribution. In one example, a communications device is equipped to provide a parity portion of titles in a channel of a service to a plurality of UEs at a first time, receive, from a UE at a second time, a request to access a title of the one or more titles, and provide an enablement item, to the requesting UE, which is a portion of the requested title that, when processed with the provided parity portion of the requested title, is sufficient to allow the requesting UE to decode and access to the requested title. In an aspect, the parity portion may be a parity portion of a fountain code encoded title, and the enablement item may be repair symbols of the fountain code encoded title.

78 Claims, 9 Drawing Sheets

(56) References Cited

U.S. PATENT DOCUMENTS

| | | | |
|---|---|---|---|
| 2005/0193177 A1 | 9/2005 | Moga et al. | |
| 2006/0277271 A1 | 12/2006 | Morse et al. | |
| 2010/0235329 A1 | 9/2010 | Koren et al. | |
| 2012/0317601 A1* | 12/2012 | Hong et al. | 725/40 |
| 2014/0006951 A1* | 1/2014 | Hunter | 715/719 |
| 2015/0058892 A1* | 2/2015 | Lee et al. | 725/39 |

OTHER PUBLICATIONS

ATSC: "ATSC Mobile DTV Standard, Part 6—Service Protection", May 23, 2011, XP055080411, Retrieved from the Internet: URL: http://www.atsc.org/cms/standards/a153/a_153-Part-6-2011.pdf [retrieved on Sep. 20, 2013] Section 4.

International Search Report and Written Opinion—PCT/US2013/046239—ISA/EPO—Oct. 1, 2013.

OMA: "DRM Architecture Approved Version 2.0—Mar. 3, 2006 Open Mobile Alliance OMA-AD-DRM-V2 0-20060303-A", Internet Citation, Mar. 3, 2006, XP002439607, Retrieved from the Internet: URL: http://www.openmobilealliance.org/release_program/docs/DRM/V2_0-20060303-A/OMA-AD-DRM-V2_0_20060303-A.pdf [retrieved on Jun. 27, 2007] Section 4 and section 6.

* cited by examiner

METHODS AND APPARATUS FOR PROVIDING HYBRID UNICAST BROADCAST SERVICES

CLAIM OF PRIORITY UNDER 35 U.S.C. §119

The present Application for Patent claims priority to Provisional Application No. 61/663,521 entitled "METHODS AND APPARATUS FOR PROVIDING HYBRID UNICAST BROADCAST SERVICES" filed Jun. 22, 2012, and assigned to the assignee hereof and hereby expressly incorporated by reference herein.

BACKGROUND

The disclosed aspects relate generally to communications between devices and specifically to methods and systems for facilitating improved distribution of service content through unicast and/or broadcast transmissions.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Currently, there are certain classes of services that depend on unicast communications to provide a per user customized service. These services may be nominally entertainment based and file delivery based. Further, this type of service may become constrained by network congestion and thereby potentially reducing a user's enjoyment/use of the service. Network congestion can be an issue for services that provide per user real time unicast customized services. The network may either provide too low a throughput or too great a delay, even with an adaptive streaming solution such as dynamic adaptive streaming over HTTP (DASH), to provide even a lowest grade of service.

Further, content available through an entertainment based service may be constrained by various digital rights management (DRM) agreements. As a result, using DRM is more expensive for a service provider, which must pay licensing fees under these DRM agreements. In addition, implementing the key management aspects of DRM, including establishment of chain of trust on the device, can further increase the service provider's costs.

Thus, improved apparatus and methods for reducing network congestion while maintaining an individualized service are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating hybrid unicast/broadcast service distribution. In one example, a communications device is equipped to provide a parity portion of titles in a channel of a service to a plurality of UEs at a first time, receive, from a UE at a second time, a request to access a title of the one or more titles, and provide, to the requesting UE, an enablement item, which is a portion of the requested title that, when processed with the provided parity portion of the requested title, is sufficient to allow the requesting UE to decode and access the title. In an aspect, the parity portion may be a parity portion of a fountain code encoded title, and the enablement item may be repair symbols of the fountain code encoded title.

According to related aspects, a method for facilitating hybrid unicast/broadcast service distribution is provided. The method can include providing a parity portion of one or more titles in a channel of a service to at least one UE of a plurality of UEs at a first time. In an aspect, the channel may include one or more titles and the service includes one or more channels. Further, the method can include receiving, from a UE of the plurality of UEs at a second time, a request to access a title of the one or more titles. Moreover, the method may include providing, to the requesting UE of the plurality of UEs, an enablement item, which is a portion of the requested title that, when processed with the provided parity portion of the requested title, is sufficient to allow the requesting UE to decode and access the title.

Another aspect relates to a communications apparatus enabled to facilitate hybrid unicast/broadcast service distribution. The communications apparatus can include means for providing a parity portion of one or more titles in a channel of a service to at least one UE of a plurality of UEs at a first time. In an aspect, the channel may include one or more titles and the service includes one or more channels. Further, the communications apparatus can include means for receiving, from a UE of the plurality of UEs at a second time, a request to access a title of the one or more titles. Moreover, the communications apparatus can include means for providing, to the requesting UE of the plurality of UEs, an enablement item, which is a portion of the requested title that, when processed with the provided parity portion of the requested title, is sufficient to allow the UE to decode and access the title.

Another aspect relates to a communications apparatus. The apparatus can include a processing system configured to provide a parity portion of one or more titles in a channel of a service to at least one UE of a plurality of UEs at a first time. In an aspect, the channel may include one or more titles and the service includes one or more channels. Further, the processing system may be configured to receive, from a UE of the plurality of UEs at a second time, a request to access a title of the one or more titles. Moreover, the processing system may further be configured to provide, to the requesting UE of the plurality of UEs, an enablement item, which is a portion of the requested title that, when processed with the provided parity portion of the requested title, is sufficient to allow the UE to decode and access the title.

Still another aspect relates to a computer program product, which can have a computer-readable medium including code for providing a parity portion of one or more titles in a channel of a service to at least one UE of a plurality of UEs at a first time. In an aspect, the channel may include one or more titles and the service includes one or more channels. Further, the computer-readable medium may include code for receiving, from a UE of the plurality of UEs at a second time, a request to access a title of the one or more titles. Moreover, the computer-readable medium can include code for providing, to the requesting UE of the plurality of UEs, an enablement item, which is a portion of the requested title that, when processed with the provided parity portion of the requested title, is sufficient to allow the UE to decode and access the title.

According to related aspects, a method for facilitating hybrid unicast/broadcast service distribution is provided. The method can include receiving, by a UE, a parity portion of one or more titles in a channel of a service at a first time. In an aspect, the channel may include one or more titles and the service may include one or more channels. Further, the method can include caching the parity portion of the one or more titles. Further, the method can include transmitting a request to access a title of the one or more titles at a second time after the first time. Further, the method can include receiving, over a unicast transmission, an enablement item for the title. In an aspect, the enablement item may be a portion of the requested title. Moreover, the method may include accessing, upon receipt of the enablement item, the title through addition of the enablement item to the cached parity portion of the title.

Another aspect relates to a communications apparatus enabled to facilitate hybrid unicast/broadcast service distribution. The communications apparatus can include means for receiving, by a UE, a parity portion of one or more titles in a channel of a service at a first time. In an aspect, the channel may include one or more titles and the service may include one or more channels. Further, the communications apparatus can include means for caching the parity portion of the one or more titles. Further, the communications apparatus can include means for transmitting a request to access a title of the one or more titles at a second time after the first time. Further, the communications apparatus can include means for receiving, over a unicast transmission, an enablement item for the title. In an aspect, the enablement item may be a portion of the requested title. Moreover, the communications apparatus can include means for accessing, upon receipt of the enablement item, the title through addition of the enablement item to the cached parity portion of the title.

Another aspect relates to a communications apparatus. The apparatus can include a processing system configured to receive, by a UE, a parity portion of one or more titles in a channel of a service at a first time. In an aspect, the channel may include one or more titles and the service may include one or more channels. Further, the processing system may be configured to cache the parity portion of the one or more titles. Further, the processing system may be configured to transmit a request to access a title of the one or more titles at a second time after the first time. Further, the processing system may be configured to receive, over a unicast transmission, an enablement item for the title. In an aspect, the enablement item may be a portion of the requested title. Moreover, the processing system may further be configured to access, upon receipt of the enablement item, the title through addition of the enablement item to the cached parity portion of the title.

Still another aspect relates to a computer program product, which can have a computer-readable medium including code for receiving, by a UE, a parity portion of one or more titles in a channel of a service at a first time. In an aspect, the channel may include one or more titles and the service may include one or more channels. Further, the computer-readable medium may include code for caching the parity portion of the one or more titles. Further, the computer-readable medium may include code for transmitting a request to access a title of the one or more titles at a second time after the first time. Further, the computer-readable medium may include code for receiving, over a unicast transmission, an enable-ment item for the title. In an aspect, the enablement item may be a portion of the requested title. Moreover, the computer-readable medium can include code for accessing, upon receipt of the enablement item, the title through addition of the enablement item to the cached parity portion of the title.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, systems and methods are described that may enable hybrid broadcast/unicast networks to provide an improved service via the use of a communications device cache. In such an aspect, the system may provide a communications device with a mixture of cached and live content to enable better service under poor network quality of service (QOS) (e.g., network congestion), via a blend of broadcast and/or unicast communications. Further, the system may lessen the overall impact of the service on the communication network. In an aspect, the cache composition may be managed by a network entity (e.g., service provider server) based on one or more metrics and/or projected playlists. Further, the system complexity may be reduced by using a fountain code to provide obfuscation of the cache contents.

As used herein, a "Title" may refer to a content item (e.g., media item, a single version of an item, etc.). A "Channel" may refer to a combination of titles. In an aspect, the channel may be generated for playback through a communications device and may be based on one or more user preferences. A "Service" may refer to an aggregation of one or more channels. In an aspect, the service may be distributed by a network entity (e.g., a service provider). A "cache" may refer to memory space on a communications device that is allocated to storage of one or more titles accessible through the service. "Desirability" may refer to abstraction of goodness for title and/or an aggregate cache state. An "Enablement item" may refer to data used to allow the communications device to access a previously non-accessible cached title. In an aspect, where a fountain code is used to encode the title, the cached title may be parity information associated with the title, while the enablement item may be repair information, that when added to the parity information, allows the title to be decoded. In another example, an enablement item may include systematic symbols, repair symbols, a decryption key, etc., or any combination thereof. A "parity portion of a title" may refer to an encrypted portion of a title, a partial delivery of a title, or any combination thereof. A "hypothetical playlist" and/or "hypothetical title list" may refer to an organizational structure (array, list, matrix, etc.) indicating one or more titles (indicated through an item number, index number, title file name, etc.).

Figure 1:
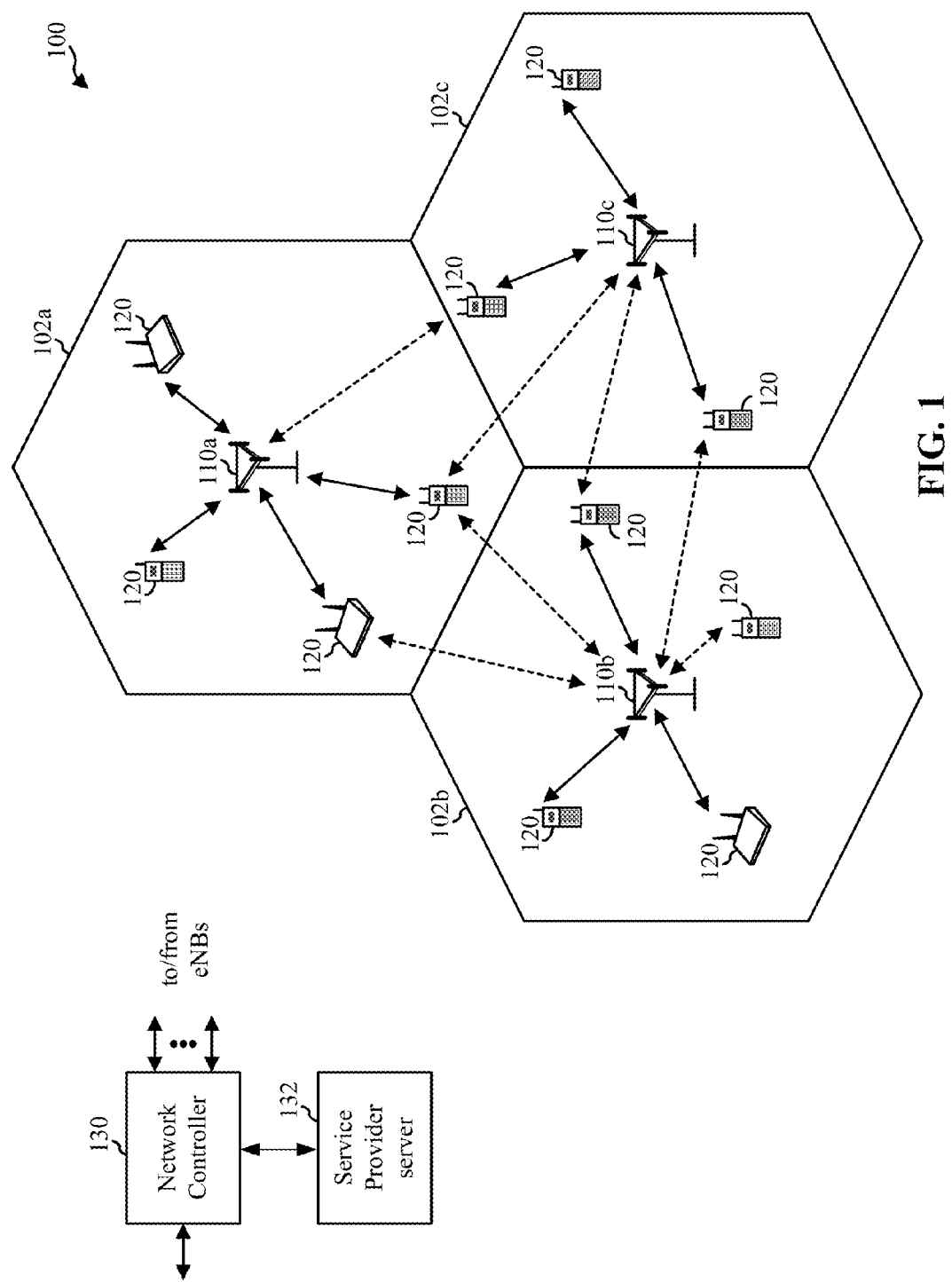
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. An eNB may support one or multiple (e.g., three) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul. In another aspect, the network controller 130 may also communicate with one or more service provider servers 132.

The UEs 120 may be dispersed throughout the wireless network 100, and each UE may be stationary or mobile. A UE may also be referred to as a device, a terminal, a mobile station, a subscriber unit, a station, etc. A UE may be a cellular phone, a personal digital assistant (PDA), a wireless modem (or other tethered device), a wireless communication device, a handheld device, a laptop computer, a tablet, a smart book, a netbook, a cordless phone, a wireless local loop (WLL) station, a smart television, a set-top box, etc. A UE may be able to communicate with macro eNBs, pico eNBs, femto eNBs, relays, etc.

Figure 2:
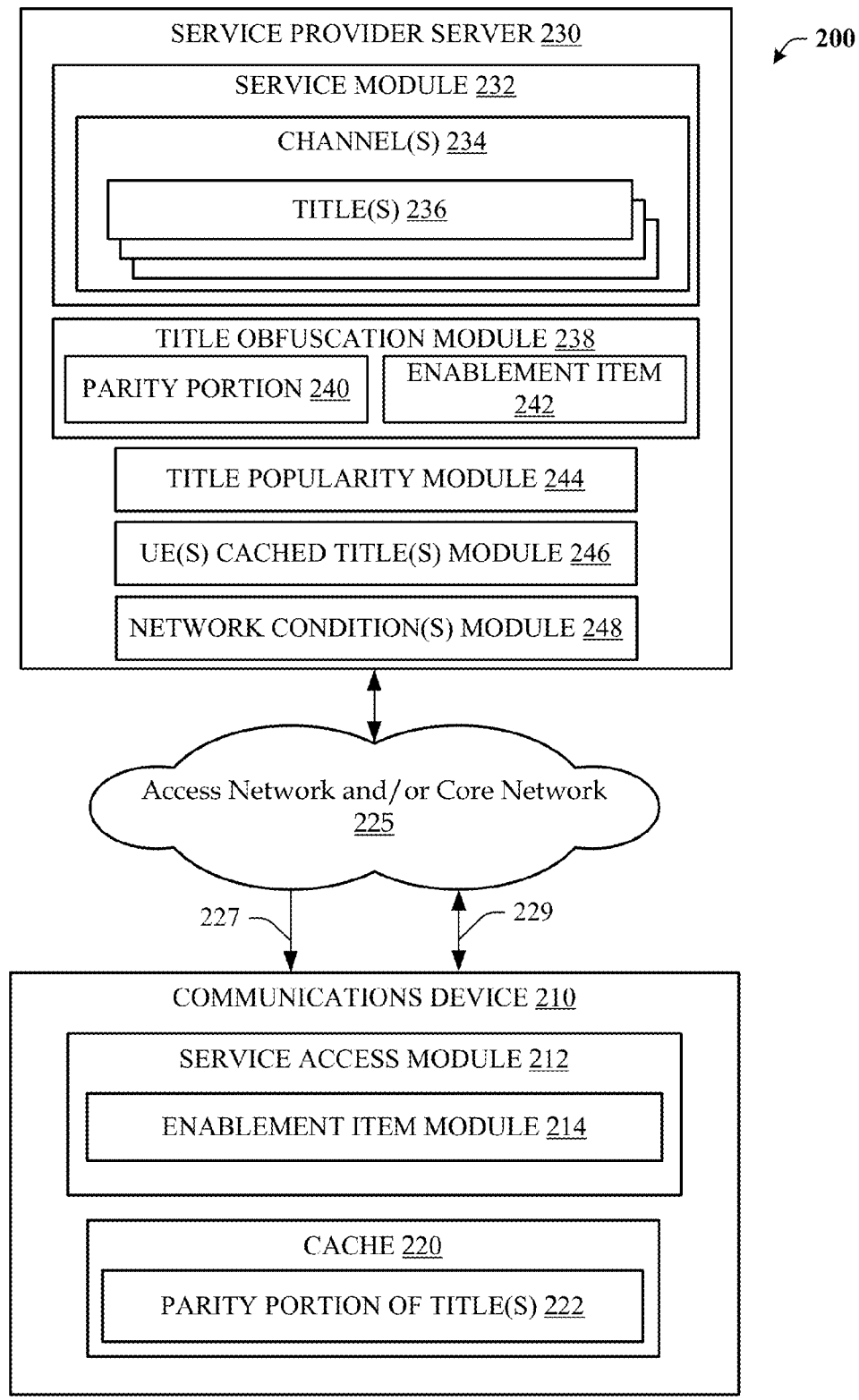
FIG. 2 illustrates a block diagram of a communication network according to an aspect.

With reference to FIG. 2, a block diagram of a communication network 200 is illustrated, according to an aspect. Communication network 200 may include communications devices 210 connected to an access network and/or core network 225, e.g., a CDMA network, a GPRS network, a UMTS network, a LTE network, a peer-to-peer network, a wireless local area network (WLAN), and other types of wireline and wireless communication networks. Communication network 200 may further include a one or more of servers, such as service provider server 230, connected to network 225. In operation, network 225 may enable communications between service provider server 230 and one or more communications devices 210 using broadcast transmissions 227 and/or unicast communications 229.

Communications device 210 may include a service access module 212 and associated cache 220. In an aspect, cache 220 may include one or more parity portions of one or more titles 222. In some instances, content licensing agreements may not allow storage (e.g., clear text storage) of content ahead of playback. To avoid potentially avoid such content storage constraints, a partial (e.g., non-decodable) portion of a title 222 may be stored in cache 220. In an aspect, a parity portion of a title 222 may a parity (e.g., repair data) portion of a fountain encoded (e.g., Raptor, RaptorQ, etc.) title. As used herein, a fountain code may be a code with the property that the original source symbols can be recovered from any subset of the encoding symbols of size equal to or only slightly larger than the number of source symbols K. In other words, a sub-set of symbols less than K is not decodable (e.g., a parity portion of a title 240) without the presence of at least K encoded symbols (e.g., an enablement item 242) being present. As such, no clear text will be present in the pre-delivered content if only repair (parity) symbols were sent, and only a few additional symbols of data may allow the communications device 210 to achieve a successful decode. Further, there is no encryption used and as such no key management is needed.

In an aspect, cache 220 may store the one or more parity portions of the one or more titles 222 in decode order. In such an aspect, the decoded order storage may be written to Flash storage in pages (e.g., 8 kB data segments). In another aspect, the one or more titles may be delivered as non-overlapping sets of repair symbols for each type of delivery, per unicast push, per broadcast push, per unicast enablement, thereby assuring no duplicate symbols are delivered, despite multiple connections to the server. Further, communications device 210 may support non-overlapping symbol sets for multiple unicast connections for the same user, so potentially, multiple unicast content connections and multiple unicast entitlement connections, and multiple broadcast sessions may deliver no duplicate symbols, despite concurrent or overlapping connections. Cache 220 may store segment durations so as to allow various streaming methods to decode a new segment prior to the completion of playback of the previous segment. For example, if a 32 kbps audio bit rate is being used during a playback, a 10 second segment is 320 kbs or 5 8 kB writes. If a DASH ten second segment duration is being utilized, only 10 seconds of audio is contained in any given file. In an aspect, cache 220 may be organized to receive segment blocks, as defined through DASH segments, HTTP live streaming (HLS) segments, mobile streaming service (MSS), etc. Service access module 212 may decode a title when a sufficient number of symbols (e.g., an enablement item 242) have been received. If the number of additional symbols used to decode is set at 10% of segment size, the start-up time for the delivery of enablement is only 1 second for 32 kbps channel throughput. Additionally, stall free service can be maintained with only 3.2 kbps average throughput. In another aspect, the larger the decoded file size the lower the required percentage of bit rate that is required, while maintaining desirable symbol sizes. Further, cache 220 may initially be empty. In such an aspect, service module 232 may not utilize aggressive unicast push to fill cache 220, but rather may wait until broadcast 227 has had a chance to provide one or more titles to cache 220. In such an aspect, service module 232 may be aware of one or more user selected channels, and whether near future broadcast 227 bill of lading may populate the cache 220.

In an aspect, service access module 212 may include an enablement item module 214. Enablement item module 214 may be configured to receive an enablement item (e.g., enablement item 242) for a title and to combine the enablement item 242 with a corresponding parity portion of the title 222 to allow service access module 212 to decode at least a portion of the corresponding title. In an aspect, enablement item module 214 may request the enablement item 242 using a byte range request, which may be the size of the number of symbols used to decode the title. In another aspect, service access module 212 may use a DRM scheme. In such an aspect, decryption keys may be delivered at the time of playback. Although a DRM key may use less overall bytes than an enablement item 242, the DRM key may additionally use a dedicated DRM server and the establishment of trust between the communications device 210 and the dedicated DRM server. In another aspect, service access module 212 may determine that desirability of broadcast 227 item is greater than a cached item and may choose to delete a cached item to make space for an offered broadcast 227 item. Further, since communications device 210 may connect via wideband connections in between or ahead of a broadcast 227 push and/or user initiated unicast 229, service provider server 230 may advertise future bills of lading so the communications device 210 may opportunistically fetch one or more desirable titles 236. In such an aspect, the communications device 210 may attempt to obtain a title via a broadcast 227 when the communications device 210 is coupled to external power and/or if there is a peer to peer opportunity. In another aspect, service access module 212 may make available, to other applications, services, etc. operable on the communications device 210, a list of items potentially available for access. In still another aspect, service access module 212 may query one or more other applications, services, etc., operable on the communications device 210 to determine what titles may be available on the communications device 210.

Content server 230 may include service module 232, title obfuscation module 238, title popularity module 244, UE cached titles module 246, and network conditions module 248.

In an aspect, service module 232 may include one or more channels 234, each of which may include access to one or more titles 236. In an aspect, service module 232 may be configured to provide one or more channels 234 for user access based on user preferences. In another aspect, channels 234 may provide various organizational structures to organize titles 236 (e.g., title type, title genre, etc.). In such an aspect, the organizational structures may be dynamic and/or may be based on user preferences. Further, title obfuscation module 238 may be configured to obfuscate each title 236. In an aspect, title obfuscation module 238 may generate a parity portion of the title 240 that may be provided in advance to a communications device 210, and an enablement item 242 that, when combined with the parity portion of the title 240, allows the communications device to decode the title 236 or at least a portion of the title 236. Further, title popularity module 244, UE cached title module 246, and/or network conditions module 248 may be used to determine how and when the parity portions 240 may be communicated to the communications device 210. These modules (244, 246, and/or 248) may assist service module 232 in determining how to mix cached, broadcast 227 and unicast 229 content in the service, how to populate the cache 220, and/or how to manage (e.g., clean up) the cache 220. In an aspect, service module 232 may determine that the service may be optimally provided through unicast 229 real-time streaming of a portion, and broadcast 227 delivery of another portion to cache 220, thereby allowing fallback to cached playback via a unicast enablement item 242. In another aspect, service module 232 may determine that the service may be optimally provided through unicast 229 and broadcast 227 delivery to cache 220, thereby allowing cached playback via a unicast enablement item 242 and with fallback to real-time streaming.

Title popularity module 244 and/or UE cached title module 246 may assist service module 232 in determining content of a broadcast push. In an aspect, title popularity module 244 may aggregate content of multiple communications devices' caches. In such an aspect, as each communications device 210 updates its cache 220, title popularity module 244 may log the state and construct a "bill of lading" for the next broadcast push that can optimize the overall cache based on titles that may maximize the aggregate cache desirability of the network 200. For example, the most likely to be accessed titles, which are not currently in the caches 220 of many of the devices, may be broadcast 227. By contrast, service module 232 may unicast titles 236 to specific communications devices 210 that may enhance desirability for the specific cache 220.

Further, UE cached titles module 246 and/or title popularity module 244 may assist service module 232 in creating hypothetical playlists based on current cache 220 content. In an aspect, the hypothetical playlist may be generated for titles 236 within each channel 234. In another aspect, the hypothetical playlist may be titles 236 aggregated across multiple channels 234 and/or over the entire service. Based in part on the hypothetical playlist, service module 232 may deliver unicast 227 push items that have a low probability of being included in the next broadcast bill of lading and/or high probability for a future playback by a specific user.

Network conditions module 248 may assist service module 232 in determining whether broadcast or unicast transmissions should be used. In an aspect, network conditions module 248 may measure network 225 available bandwidth, QOS, etc.

In operation, cached content (e.g., parity portions of titles 222) may be used to augment unicast service delivery to a communications device 210. This hybrid (e.g., part broadcast 227 part unicast 229 delivery) service may be constructed through various schemes. In an aspect, service module 232 may use of a blend of full unicast and partial unicast items, on an item by item basis, with priority being given to use of cached content over real-time unicast content. In such an aspect, the service mix may be skewed towards popular pre-cached titles 236, which may not work for users that select less popular channels 234 and/or titles 236, but works well generally for other users. In another aspect, service module 232 may mix unicast and cached content according to network loading. In such an aspect, service module 232 may determine network loading information from network conditions module 248. In such an aspect, service module 232 may offer the potential for high efficiency and high quality title access. In another aspect, service module 232 may attempt to deliver content to cache 220 and concurrently freshen up the cache 220, when the unicast 229 bandwidth is available.

In another aspect, service access module 212 may select playback of a title based at least in part on the network 225 QOS. In such an aspect, service access module 212 may increase the use of cached content when network conditions are poor. In another aspect, service module 232 may consider providing comparatively more content into cache 220 (via unicast 229 when network conditions are good and the cache is depleted and/or stale). As used herein, "stale" may refer to content that has been played recently, has been skipped one or more times, and/or is a candidate for deletion. In another aspect, service module 232 may manage the cache 220 based on the projected play time. A projected play time may be determined based on a user's tendency to consume x hours of content a day, and/or a tendency to consume y hours of content on a day that the user takes service. In another aspect, when the sufficiency of the cache 220 is marginal, even under relatively poor network 225 QOS, communications device 210 may still accept titles (e.g., media) into cache 220 (maybe at a lower rate than real time to extend the useful life of the cache). In such an aspect, communications device 200 may stop taking more unicast 229 provided titles 236 into cache 220 when target service duration time is met.

In another operational aspect, service module 232 may provide a preference for certain types of content. In such an aspect, when a user is depleting the cache 220 of a certain category of content, downloads via unicast 229 may concentrate on refilling categories that are being depleted. As used herein, "depleted" refers when content's value and/or likelihood of being used and/or reused soon has declined (e.g., reduced desirability).

In still another operational aspect, service module 232 may manage cache 220 based on one or more desirability characteristics. For example, desirability may be affected by how long since the item has been used (e.g., once a title 236 has been used, its value for immediate reuse may decrease, however the longer the title 236 remains in the cache 220 the probability/desirability of reuse may increase). In another example, a title 236 may become less desirable when it is skipped. In another aspect, service access module 212 may treat the cached content 222 with the similar sorts of preferences as service module 232. In such an example aspect, service access module 212 and service module 232 may modify availability of a title 236 in different manners. For example, while a given title 236 may not be globally deleted from the service provider server 230, service access module 212 may delete the title 236 from the communications device 210.

In another operational aspect, the duration of various content items (e.g., titles 236) may vary as well as delivery rate. Also, the communications device 210 may close the application that is receiving the title 236 while an object has only been partially retrieved. As such, cache 220 may include some incomplete items. Service module 232 may resume their delivery when the application restarts, and/or when the network 225 QOS is suitable. In another aspect, the communications device 210 may continue to take content if the user is a "power user" and the network 225 conditions are favorable (e.g. if the current network supported bit rate is higher than the device typically sees in a unicast connection, and the cache 220 condition is weak).

In still another aspect, cached items 222, once decoded, may be sold to a user (e.g., when high quality content has been decoded from the cache 220). In another aspect, where streamed content is not delivered at as high a quality as a purchased item, service module 232 may forward the purchase request to an appropriate content provider. In such an aspect, the user may have access to playback of the cached content with high quality fulfillment at a later time (e.g., via Wifi connection, wired connection, etc.). In another operational aspect, service module 232 may bind an advertisement to at least one title 236. In such an aspect, service module 232 may allow the unicast 229 delivery of additional byte range(s) to be stored, which otherwise might not be allowed.

In another optional operational aspect, where the codec used impacts the license related costs for an operator, service module 232 may use opportunistic bandwidth access and may allow the use of older and possibly cheaper codecs (e.g. MP3 vs. HEAAC v2).

As such, devices may communicate more efficiently through use of various combinations of unicast 229 and broadcast 227 communications, thereby reducing network 225 congestion and improving a user experience associated with a service.

Figure 3:
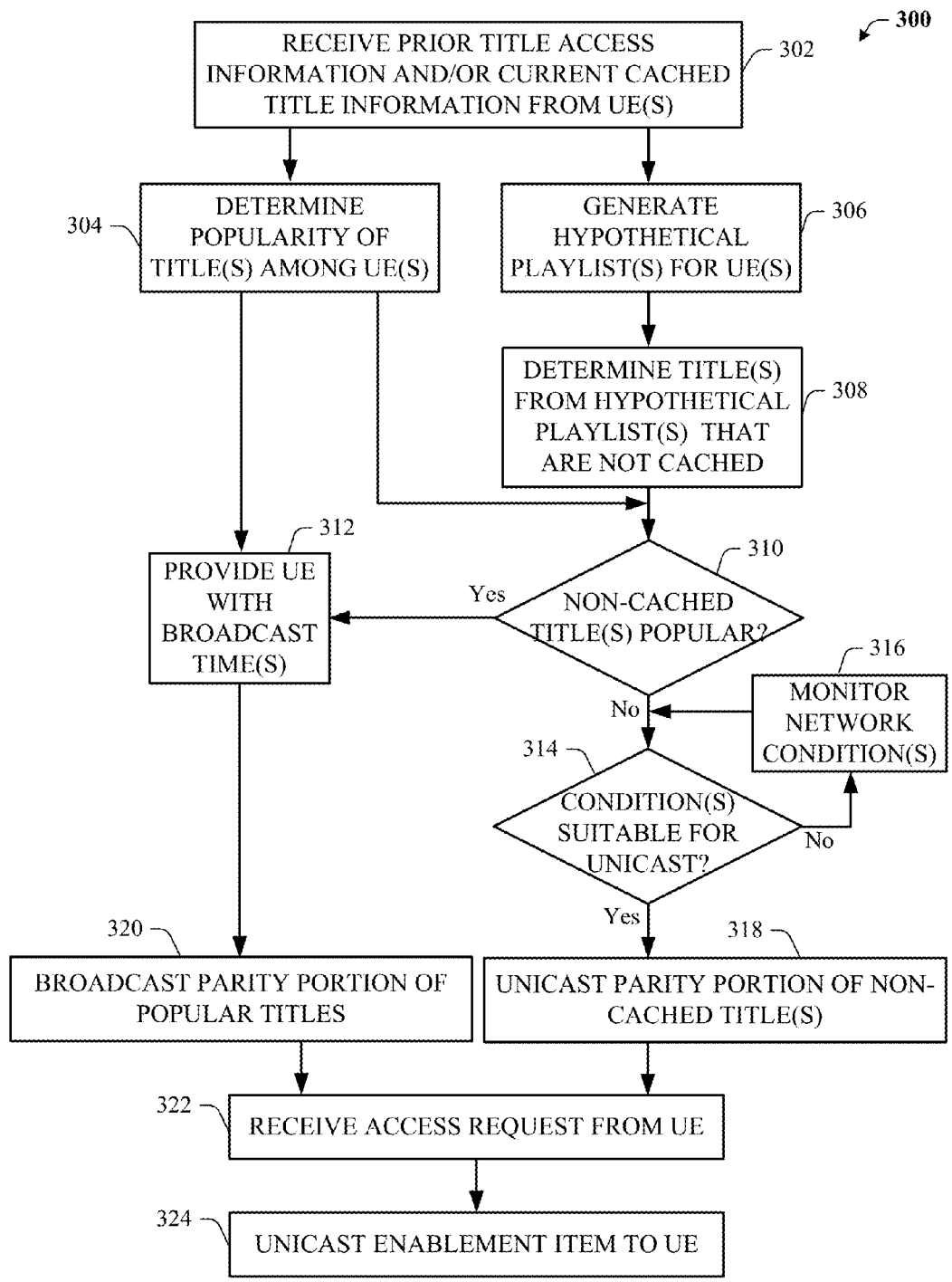
FIG. 3 illustrates a flowchart describing an example system for facilitating hybrid unicast/broadcast service distribution, according to an aspect.
Figure 4:
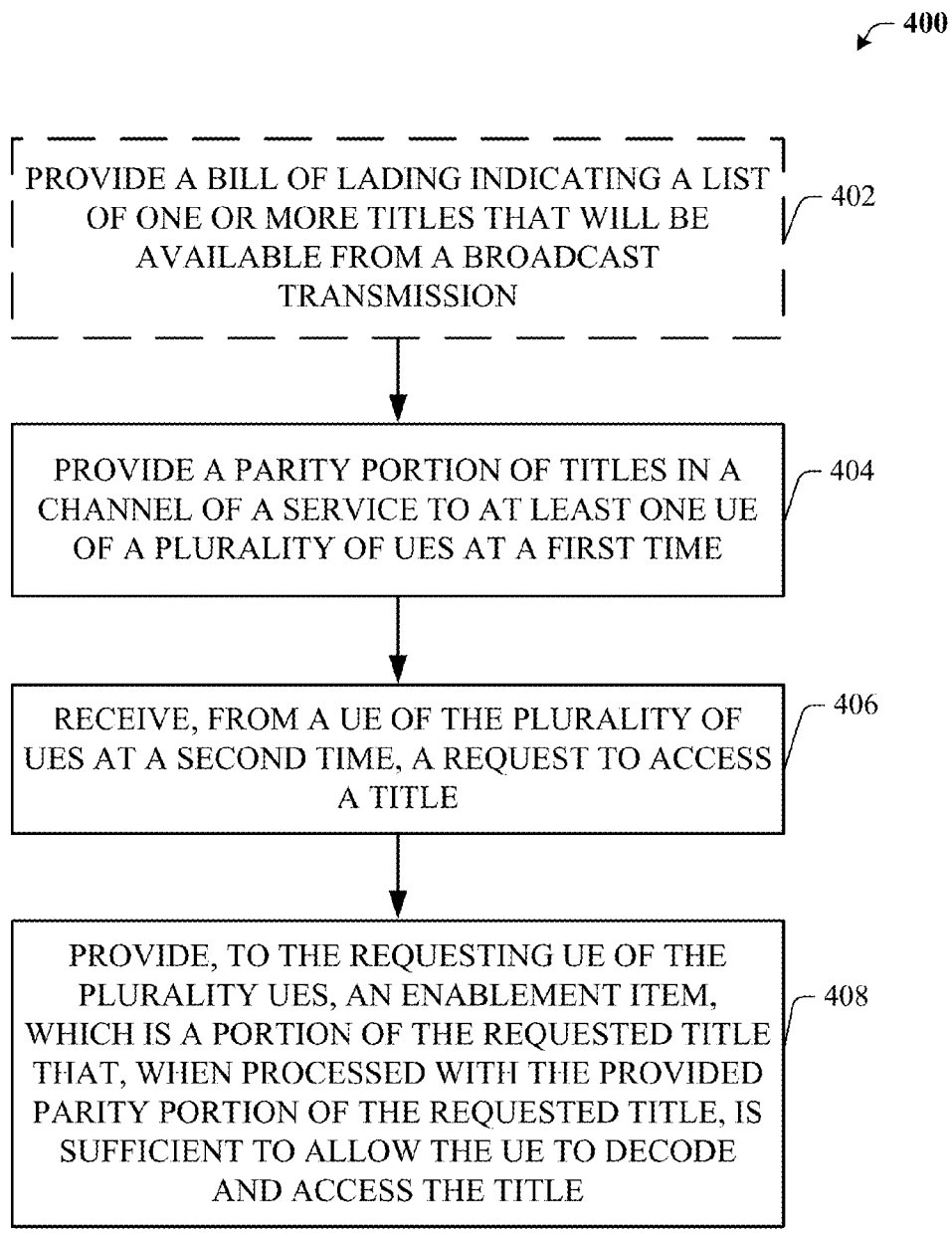
FIG. 4 illustrates a flowchart describing an example system for facilitating hybrid unicast/broadcast service distribution, according to an aspect.
Figure 5:
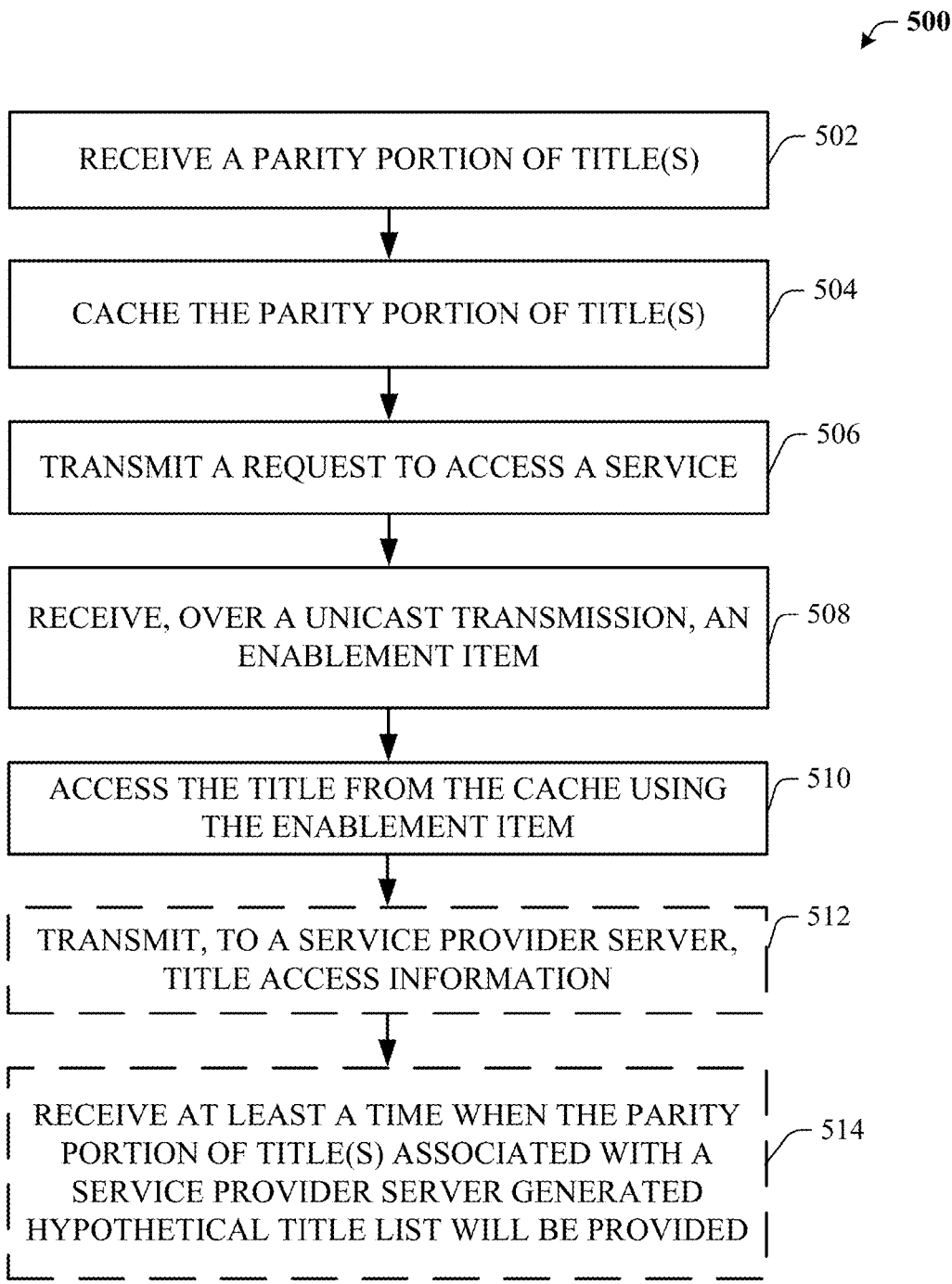
FIG. 5 illustrates another flowchart describing an example system for facilitating hybrid unicast/broadcast service distribution, according to an aspect.

FIGS. 3, 4, and 5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 3, an example flowchart describing a system 300 for facilitating hybrid unicast/broadcast service distribution is illustrated.

At block 302, a service provider server may receive prior title access information and/or current cached title information from various UEs that have access to a service. In an aspect, the service provider server may maintain a record of content cached on each UE that accesses the service. In such an aspect, the record may include symbols stored correctly per item, and optionally, may include per title playback history. In another aspect, the received information may be used to update the service provider server record of cached content upon each cache state change when a UE is in connected state. In still another aspect, the record may be updated at the beginning and/or end of each active unicast session.

At block 304, the service provider server may determine popularity (e.g., desirability) for each of the one or more titles available through the service. In an aspect, a title's desirability may be determined per title and/or in the context of current cache and/or device defined channels. In another aspect, service provider server may generate an aggregate cache desirability based on current content cached on a UE. In another aspect, the determined popularity may be used to generate a broadcast bill of lading. In such an aspect, the generation of the broadcast bill of lading may take into consideration various factors, such as but not limited to, regional and/or market differences in user preferences (e.g. more country music goes to Nashville).

At block 306, the service provider server may generate a hypothetical playlist for each UE of one or more UEs that may access the service. In an aspect, the hypothetical playlist may be generated based on various user preferences, historical usage patterns, information derived from other user's usage, etc.

At block 308, the service provider server may determine one or more titles from the hypothetical playlist that are not currently cached by the UE.

At block 310, the service provider server determines whether any of the non-cached titles have been determined to be popular. In an aspect, the service provider service may bias to providing titles to a UE through a broadcast push rather than a unicast communications session. Such a bias may assist in reducing network congestion issues.

If at block 310, the service provider server determines that any of the non-cached titles were determined to be popular (at block 304), then at block 312, the service provider server may provide one or more times when these popular titles are to be broadcast. In an aspect, service provider server may publish broadcast bill of lading in advance of the broadcast push. In such an aspect, a UE may opportunistically acquire the titles ahead of the push, if available, by wired or other high bandwidth connections and/or peer to peer communications.

By contrast or in addition, if at block 310, the service provider server determines that one or more of the non-cached titles have not been determined to be popular (at block 304), then at block 314, the service provider server may determine whether network conditions are suitable for establishing a unicast connection with a UE. In an aspect, the network may be considered conducive to establishing a unicast connection when there is low congestion, high bandwidth availability, and/or a depleted cache at the UE. In still another aspect, aggressiveness of the cache unicast replenishment may be based on combination of metrics including cache playback time in current channel, cache freshness, and/or desirability metric per title.

If at block 314, the service provider server determines that network conditions are not currently suitable for establishing a unicast connection, then at block 316, the service provider server may continue to monitor network conditions.

By contrast, if at block 314, the service provider server determines that network conditions are suitable for establishing a unicast connection, then at block 318, the service provider server may unicast parity portions of the non-cached content to a UE. In an aspect, the parity portion of each title may include a parity portion of a fountain code encoded title. In an aspect, unicast transmission may be performed in low and/or high bandwidth environments. Low bandwidth (e.g., slower than real time) may be used if network QOS is constrained, while high bandwidth (e.g., faster than real time) may be used when network QOS is good.

Returning to block 312 where the UE is provided with one or more times when popular titles may be broadcast, at block 320, the service provider server may broadcast parity portions of the popular titles at the provided time. In an aspect, the parity portion of each title may include a parity portion of a fountain code encoded title.

At block 322, the service provider server may receive a request to access one or more titles available through the service (and cached on the device). In an aspect, the request may be a byte range request.

At block 324, the service provider server may provide an enablement item to the requesting UE. In an aspect, the enablement item may be unicast to the requesting UE. In an aspect, the enablement item may include one or more repair symbols that, when added to the parity portion of the fountain code encoded title, allow the requesting UE to decode at least a portion of the title.

As such, a method for providing a service to one or more UEs using a hybrid unicast/broadcast scheme is provided.

With reference now to FIG. 4, another example flowchart describing a system 400 for facilitating hybrid unicast/broadcast service distribution is illustrated.

In an optional aspect, at block 402, a service provider server may provide a bill of lading, to a plurality of UEs, indicating a list of titles that will be available from a broadcast transmission. In an aspect, the titles included in the bill of lading may be determined based on popular titles from a hypothetical title list associated with one or more UEs of the plurality of UEs. In such an aspect, the hypothetical play list may be generated from title access information received from at least a portion of the plurality of UEs, popularity of the titles among the plurality of UEs, etc.

At block 404, the service provider service may provide a parity portion of one or more titles in a channel of a service to at least one UE of a plurality of UEs at a first time. In an aspect, the channel may include one or more titles and the service may include one or more channels. In an aspect, the parity portion of each title may include a parity portion of a fountain code encoded title. In such an aspect, the fountain code may be a Raptor code (e.g., RaptorQ). In an aspect, the parity portion may be provided to the UE to allow for decode order storage. In an aspect, the title may be formatted in segments for delivery using dynamic adaptive streaming over HTTP (DASH), HTTP live streaming (HLS), or mobile streaming service (MSS). In another aspect, providing the parity portion may include determining that a level of interest in the title among the plurality of UEs is greater than a popularity threshold and providing the parity portion of the title for a broadcast transmission. In another aspect, providing the parity portion may include determining that a level of interest in the title among the plurality of UEs is not greater than the popularity threshold and providing the parity portion of the title for a unicast transmission to any UEs that have a level of interest in the title above the popularity threshold. In another aspect, providing the parity portion may include determining values such as, a network congestion value, a unicast connection throughput value, etc., and providing the parity portion of the title for the unicast transmission when at least one of the network congestion value is below a threshold value, the unicast connection throughput value is above a threshold value, or any combination thereof. In another aspect, providing the parity portion may include receiving title access information from the at least a portion of the plurality of UEs, generating a hypothetical title list for a UE, determining whether one or more titles in the hypothetical title list is not cached by the UE, and providing at least a time to the UE for when the parity portion of the one or more titles from the hypothetical title list that are not cached will be provided. In such an aspect, the hypothetical playlist may be generated as a list of titles within a channel of the one or more channels in the service, a list of titles across multiple channels of the one or more channels in the service, etc. In another aspect, providing the parity portion may include binding an advertisement content item to access of the title, and providing the advertisement content item to the UE. In another aspect, providing the parity portion may include using at least one of a cellular network, a peer-to-peer connection, a wireless local area network (WLAN) connection, or any combination thereof, in which a broadcast mode and unicast mode of communications are available. In another aspect, providing the parity portion may include using non-overlapping sets of repair symbols for at least one of: per a type of delivery, per a unicast transmission, per a broadcast push, or any combination thereof, to avoid duplicate symbol delivery. In another aspect, providing the parity portion may include using non-overlapping symbol sets for multiple unicast connections for the same user to avoid duplicate symbol delivery. In another aspect, providing the parity portion may include determining whether an allotment of memory in a UE is sufficient to store the parity portion of the one or more titles, and prompting the UE to allocate additional memory for caching upon at determination that the allotment of memory is insufficient to store the parity portion of the one or more titles.

At block 406, the service provider server may receive, from a UE of the plurality of UEs at a second time, a request to access a title of the one or more titles. In another aspect, the request may be for a service, or portion of a service, such as a channel, etc.

At block 408, the service provider server may provide an enablement item to the requesting UE of the plurality of UEs. In an aspect, the enablement item may be a portion of the requested title, which when processed with the previously provided parity portion of the requested title (and/or service, channel, etc.) may be sufficient to allow the requesting UE to decode and access the requested title. In an aspect, the enablement item may be selected to allow a UE to decode a corresponding portion of the title associated with the enablement item prior to completion of playback of a previous title. In another aspect, providing the enablement item may include binding an advertisement content item to access of the title, and providing the advertisement content item to the UE. In another aspect, providing the enablement item may include using at least one of a cellular network, a peer-to-peer connection, a wireless local area network (WLAN) connection, or any combination thereof, in which a broadcast mode and unicast mode of communications are available.

With reference now to FIG. 5, another example flowchart describing a system 500 for facilitating hybrid unicast/broadcast service distribution is illustrated.

At block 502, a UE may receive a parity portion of one or more titles associated with a service. In an aspect, the parity portion of each title may include a parity portion of a fountain code encoded title. In another aspect, the one or more titles may be received as non-overlapping sets of repair symbols for each type of delivery, per unicast push, per broadcast push, per unicast enablement, thereby assuring no duplicate symbols are delivered. In another aspect, where the UE has not previously received content (e.g., a new user, a user that has reset settings, etc.), the UE may bias toward reception of the parity portion of one or more titles a reception mode that does not overly congest the network. For example, the UE may bias toward use of a broadcast transmission mode, a Wireless local area network (WLAN) communication mode, a peer-to-peer communication mode, or any combination thereof over use of a cellular network unicast transmission mode. In such an aspect, the UE may provide an indication to the service provider server indicating the bias toward using the one or more broadcast transmission modes, an identity of a communication mode that will be used, etc.

At block 504, the UE may cache the received parity portion of the title(s) associated with the service. In an aspect, the received content may be cached in a decode order. Further, the UE may cache the received content as non-overlapping symbol sets for multiple unicast connections for the same user, so multiple unicast content connections and multiple unicast entitlement connections, and multiple broadcast sessions may be delivered with no duplicate symbols.

At block 506, the UE may transmit a request to access the service. In an aspect, the request may be a byte range request.

At block 508, the UE may receive, for instance over a unicast transmission, an enablement item in response to the request. In an aspect, the enablement item may be received via unicast by the UE. In an aspect, the enablement item may include one or more repair symbols that, when added to the parity portion of the fountain code encoded title, allow the UE to decode at least a portion of the title. In another aspect, the enablement item may include clear text (e.g., data that may be decoded by itself).

At block 510, the UE may use the enablement item to access at least a portion of the previously non-decodable title. For example, if a 32 kbps audio bit rate is being used during a playback, a 10 second segment is 320 kbs or five 8 kB writes. If a DASH ten second segment duration is being utilized, only 10 seconds of audio is contained in any given file (e.g., parity portion of a title). The UE may decode a title when a sufficient number of symbols (e.g., an enablement item) have been received. If the number of additional symbols (e.g., enablement item sized) used to decode is set at 10% of segment size, the start-up time for the delivery of enablement is 1 second for 32 kbps channel throughput. Additionally, stall free service can be maintained with only 3.2 kbps average throughput.

In an optional aspect, at block 512, the UE may further transmit title access information to a service provider server. In such an aspect, the title access information may further include cache playback time in current channel, cache freshness, desirability metric per title, etc.

In the optional aspect, at block 514, the UE may receive at least a time when the parity portion of one or more titles associated with a service provider server generated hypothetical title list will be provided. In an aspect, where the titles are popular/desirable, the UE may be provided with a time when the titles will be available through a broadcast push. In another aspect, where the titles are not considered popular by a sufficient number of UEs, the UE may replenish the cache through a unicast connection when network conditions are conducive for such a connection.

As such, a method for accessing a service by UE using a hybrid unicast/broadcast scheme is provided.

Figure 6:
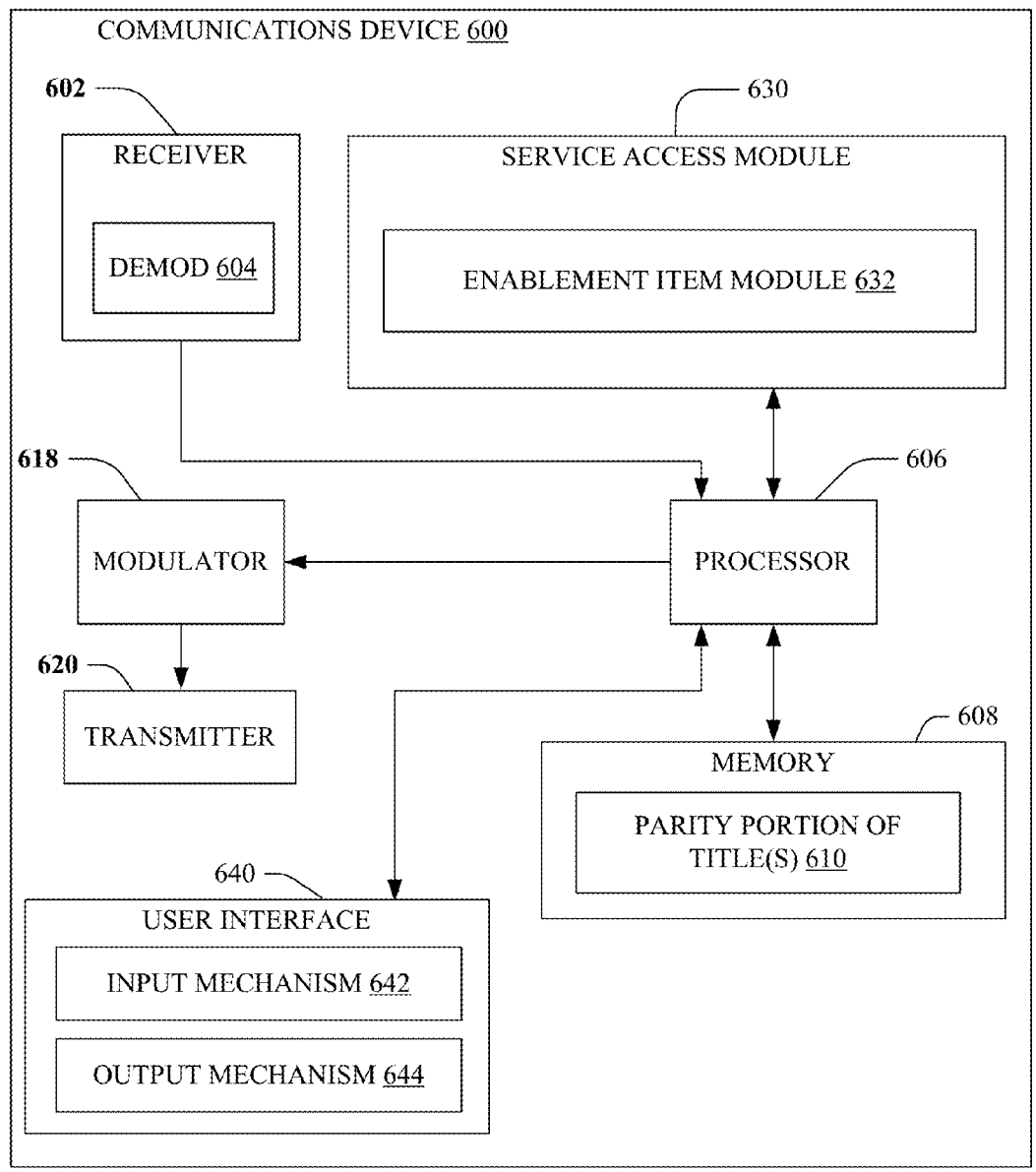
FIG. 6 illustrates a block diagram example architecture of a communications device.

While still referencing FIG. 2, but turning also now to FIG. 6, an example architecture of communications device 210 is illustrated. As depicted in FIG. 6, communications device 600 (e.g., a UE) includes receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can include a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of device 600, and/or a processor that both analyzes information received by receiver 602, generates information for modulation by modulator 618 and transmission by transmitter 620, and controls one or more components of communications device 600.

Communications device 600 can additionally include memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 608 can include may include one or more parity portions of one or more titles 610. In an aspect, a parity portion of a title 610 may a parity (e.g., repair data) portion of a fountain encoded (e.g., Raptor. RaptorQ, etc.) title. In another aspect, memory 608 (e.g., cache) may store the one or more parity portions of the one or more titles 610 in decode order.

It will be appreciated that data store (e.g., memory 608, cache, etc.) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Memory 608 of the subject systems and methods may comprise, without being limited to, these and any other suitable types of memory.

Further, processor 606, memory 608, and/or service access module 630 can provide means for receiving a parity portion of one or more titles in a channel of a service at a first time, means for caching the parity portion of the one or more titles, means for transmitting a request to access a title of the one or more titles at a second time after the first time, means for receiving, over a unicast transmission, an enablement item for the title, and means for accessing, upon receipt of the enablement item, the title through addition of the enablement item to the cached parity portion of the title. In an aspect, the channel may include one or more titles and the service may include one or more channels. In an aspect, the enablement item may be a portion of the requested title.

Device 600 can further include service access module 630. In an aspect, service access module 630 may include an enablement item module 632. Enablement item module 632 may be configured to receive an enablement item (e.g., enablement item 242) for a title and to combine the enablement item with a corresponding parity portion of the title 610 to allow service access module 630 to decode at least a portion of the corresponding title. In an aspect, enablement item module 632 may request the enablement item using a byte range request. Further, the enablement item may be the size of the number of symbols used to decode the title. Further, service access module 630 may assist communications device 600, such as described with reference to FIG. 5.

Additionally, mobile device 600 may include user interface 640. User interface 640 may include input mechanism 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver, etc. In the illustrated aspects, the output mechanism 644 may include a display operable to present media content that is in image or video format or an audio speaker to present media content that is in an audio format.

Figure 7:
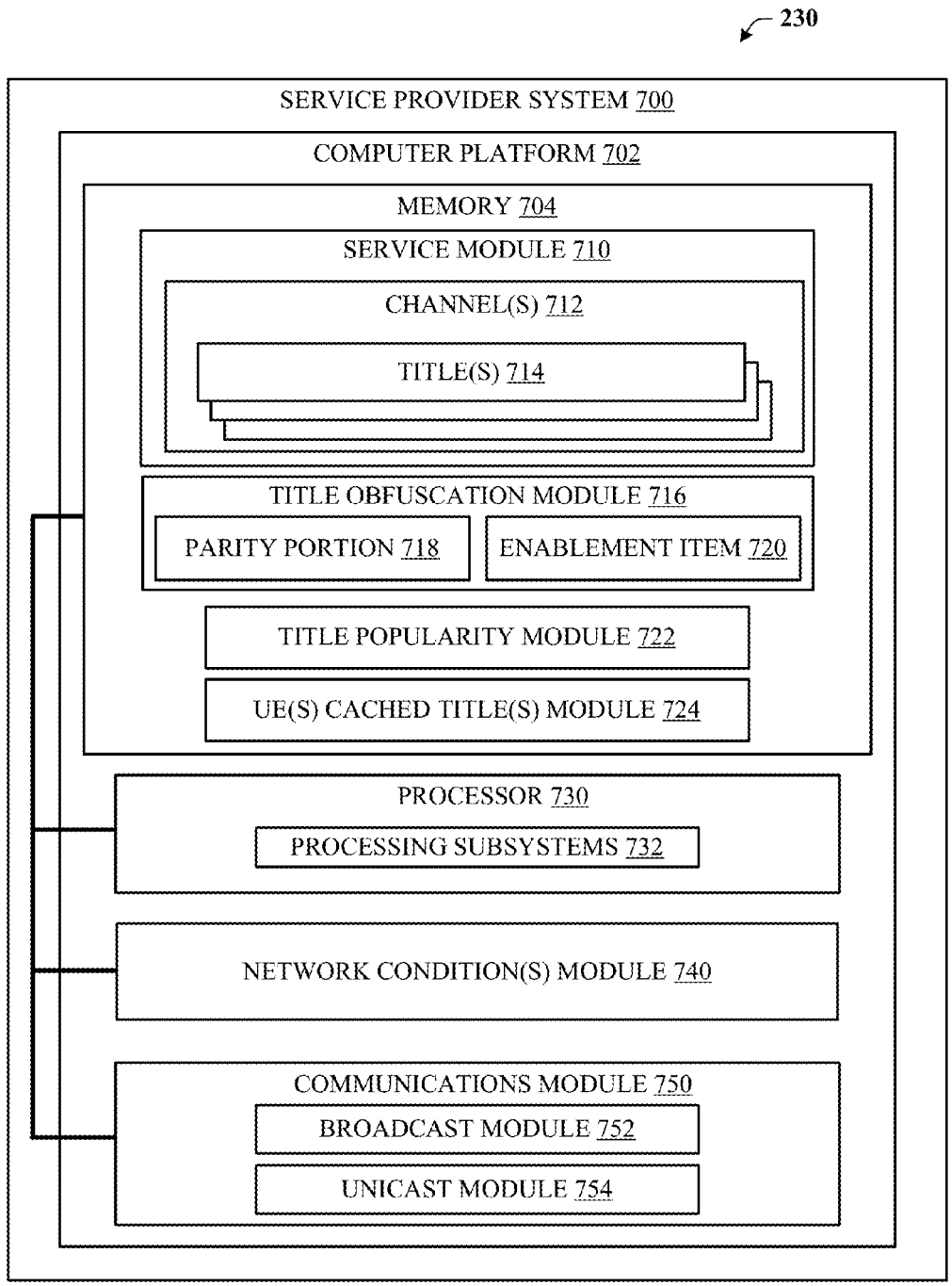
FIG. 7 illustrates exemplary block diagram of a service provider system, according to an aspect.

With reference to FIG. 7, illustrated is a detailed block diagram of service provider system 700, such as service provider server 230 depicted in FIG. 2. Service provider system 700 may include at least one of any type of hardware, server, personal computer, mini computer, mainframe computer, or any computing device either special purpose or general computing device. Further, the modules and applications described herein as being operated on or executed by service provider system 700 may be executed entirely on a single network device, as shown in FIG. 7, or alternatively, in other aspects, separate servers, databases or computer devices may work in concert to provide data in usable formats to parties, such as communications device 210, and the modules and applications executed by service provider system 700.

Service provider system 700 includes computer platform 702 that can transmit and receive data across wired and wireless networks, and that can execute routines and applications. Computer platform 702 includes memory 704, which may include volatile and nonvolatile memory such as read-only and/or random-access memory (ROM and RAM), EPROM, EEPROM, flash cards, or any memory common to computer platforms. Further, memory 704 may include one or more flash memory cells, or may be any secondary or tertiary storage device, such as magnetic media, optical media, tape, or soft or hard disk. Further, computer platform 702 also includes processor 730, which may be an application-specific integrated circuit ("ASIC"), or other chipset, logic circuit, or other data processing device. Processor 730 may include various processing subsystems 732 embodied in hardware, firmware, software, and combinations thereof, that enable the functionality service provider system 700 and the operability of the network device on a wired or wireless network.

Further, processor 730, and/or service module 710 can provide means for providing a parity portion of one or more titles in a channel of a service to at least one UE of a plurality of UEs at a first time, means for receiving, from a UE of the plurality of UEs at a second time, a request to access a title of the one or more titles, and means for providing, to the requesting UE of the plurality of UEs, an enablement item, which is a portion of the requested title that, when processed with the provided parity portion of the requested title, is sufficient to allow the requesting UE to decode and access the title. In an aspect, the channel may include one or more titles and the service includes one or more channels.

Computer platform 702 further includes network conditions module 740 embodied in hardware, firmware, software, and combinations thereof, that enables network conditions received from communications device 210, and/or other network entities corresponding to, among other things, network congestion levels, QOS metrics, etc. In one aspect, service module 710 may analyze data/network measurements received through network conditions module 740 to determine whether broadcast module 752 and/or unicast module 754 may be used within communications module 750.

Computer platform 702 further includes communications module 750 embodied in hardware, firmware, software, and combinations thereof, that enables communications among the various components of service provider system 700, as well as between service provider system 700 and one or more communications devices 210. Communication module 750 may include the requisite hardware, firmware, software and/or combinations thereof for establishing wireless and/or wireline communication connections. According to described aspects, communication module 750 may include the necessary hardware, firmware and/or software to facilitate wireless and/or wireline communication between service provider server 230 and communications device 210. In an aspect, communications module 750 may be configured to provide portions of one or more titles for broadcast through broadcast module 752 and/or unicast through unicast module 754.

Memory 704 of service provider system 700 includes a service module 710, title obfuscation module 716, title popularity module 722, and UE cached titles module 724. In an aspect, service module 710 may include one or more channels 712, each of which may include access to one or more titles 714. In an aspect, service module 710 may be configured to provide one or more channels 712 for user access based on user preferences. In another aspect, channels 712 may provide various organizational structures to organize titles 714 (e.g., title type, title genre, etc.). In such an aspect, the organizational structures may be dynamic and/or may be based on user preferences. Further, title obfuscation module 716 may be configured to obfuscate each title 714. In an aspect, title obfuscation module 716 may generate a parity portion of the title 718 that may be provided in advance to a communications device 210, and an enablement item 720 that, when combined with the parity portion of the title 718, allows the communications device 210 to decode the title 714 or at least a portion of the title 714. Further, title popularity module 722, UE cached title module 724, and/or network conditions module 740 may be used to determine how and when the parity portions 718 may be communicated to the communications device 210. Further, service module 710 may assist service provider system 700, such as described with reference to FIGS. 3 and 4.

Figure 8:
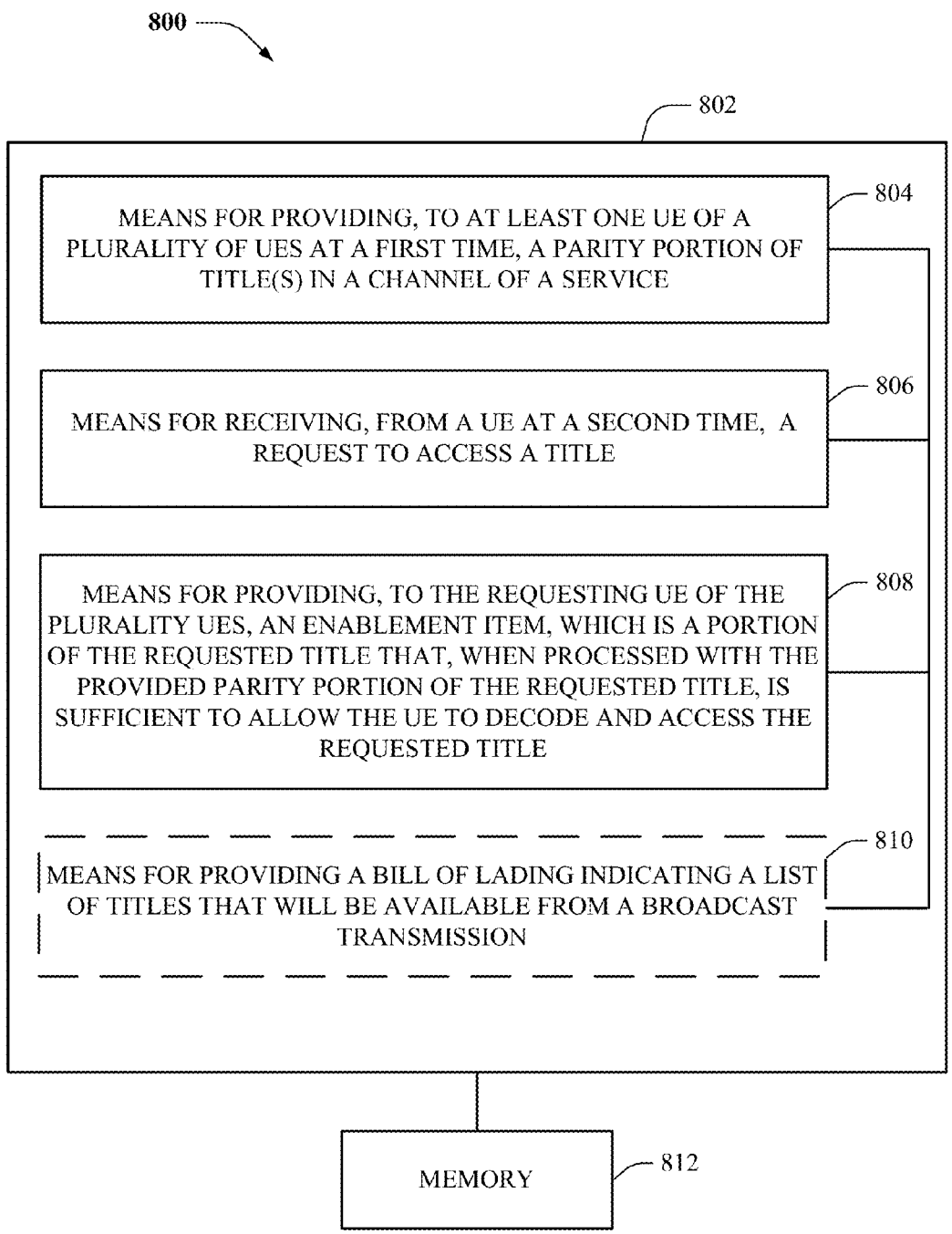
FIG. 8 depicts a block diagram of an example a communications device for facilitating hybrid unicast/broadcast service distribution, according to an aspect.

FIG. 8 depicts a block diagram of an exemplary communication system 800 operable to facilitate hybrid unicast/broadcast service distribution. For example, system 800 can reside at least partially within a network entity device (e.g., service provider server, service provider system 700). It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction.

For instance, logical grouping 802 can include an electrical component that may provide means for providing, to at least one UE of a plurality of UEs, a parity portion of one or more titles in a channel of a service at a first time 804. For example, the means for providing a parity portion 804 can include service module 710 of service provider system 700, communications module 750 of service provider system 700, and/or processor 730 of service provider system 700. In an aspect, the channel may include one or more titles and the service may include one or more channels. In an aspect, the parity portion of the requested title may include a parity portion of a fountain code encoded title. In such an aspect, the fountain code may be a Raptor code (e.g., RaptorQ). In an aspect, the means for providing the parity portion 804 may be configured to provide to the UE to allow for decode order storage. In an aspect, the requested title may be formatted in segments for delivery using dynamic adaptive streaming over HTTP (DASH), HTTP live streaming (HLS), or mobile streaming service (MSS). In an aspect, the means for providing the parity portion 804 may be configured to determine that a level of interest in the requested title among the plurality of UEs is greater than a popularity threshold, and provide the parity portion of the requested title for a broadcast transmission. In an aspect, the means for providing the parity portion 804 may be configured to determine that a level of interest in the requested title among the plurality of UEs is not greater than the popularity threshold, and provide the parity portion of the requested title for a unicast transmission to any UEs that have a level of interest in the requested title above the popularity threshold. In an aspect, the means for providing the parity portion 804 may be configured to determine values such as, a network congestion value, a unicast connection throughput value, etc., and provide the parity portion of the requested title for the unicast transmission when at least one of the network congestion value is below a threshold value, the unicast connection throughput value is above a threshold value, or any combination thereof. In an aspect, the means for providing the parity portion 804 may be configured to receive title access information from the at least a portion of the plurality of UEs, generate a hypothetical title list for a UE, determine whether one or more titles in the hypothetical title list is not cached by the UE, and provide at least a time to the UE for when the parity portion of the one or more titles from the hypothetical title list that are not cached will be provided. In such an aspect, the hypothetical playlist may be generated as a list of titles within a channel of the one or more channels in the service, a list of titles across multiple channels of the one or more channels in the service, etc. In an aspect, the means for providing the parity portion 804 may be configured to bind an advertisement content item to access of the requested title, and provide the advertisement content item to the UE. In another aspect, the means for providing the parity portion 804 may be configured to use at least one of a cellular network, a peer-to-peer connection, a WLAN connection, or any combination thereof, in which a broadcast mode and unicast mode of communications are available. In another aspect, the means for providing the parity portion 804 may be configured to use non-overlapping sets of repair symbols for at least one of: per a type of delivery, per a unicast transmission, per a broadcast push, or any combination thereof, to avoid duplicate symbol delivery. In another aspect, the means for providing the parity portion 804 may be configured to use non-overlapping symbol sets for multiple unicast connections for the same user to avoid duplicate symbol delivery. In another aspect, the means for providing the parity portion 804 may be configured to determine whether an allotment of memory in a UE is sufficient to store the parity portion of the one or more titles, and prompt the UE to allocate additional memory for caching upon at determination that the allotment of memory is insufficient to store the parity portion of the one or more titles.

Further, logical grouping 802 can include an electrical component that may provide means for receiving, from a UE of the plurality of UEs at a second time, a request to access a title of the one or more titles 806. For example, the means for receiving 806 can include communications module 750 of service provider system 700 and/or processor 730 of service provider system 700.

Further, logical grouping 802 can include an electrical component that may provide means for providing, to the requesting UE of the plurality of UEs, an enablement item, which is a portion of the requested title that, when processed with the provided parity portion of the requested title, is sufficient to allow the requesting UE to decode and access the requested title 808. For example, the means for providing an enablement item 808 can include service module 710 of service provider system 700, communications module 750 of service provider system 700, and/or processor 730 of service provider system 700. In an aspect, the enablement item may be a portion of the requested title, which when processed with the previously provided parity portion of the requested title (and/or service, channel, etc.) may be sufficient to allow the requesting UE to decode and access the requested title. In an aspect, the enablement item may be selected to allow a requesting UE to decode a corresponding portion of the requested title prior to completion of playback of a previously requested title. In an aspect, the means for providing the enablement item 808 may be configured to bind an advertisement content item to access of the requested title, and provide the advertisement content item to the UE. In another aspect, the means for providing the enablement item 808 may be configured to use at least one of a cellular network, a peer-to-peer connection, a wireless local area network (WLAN) connection, or any combination thereof, in which a broadcast mode and unicast mode of communications are available.

In an optional aspect, logical grouping 802 can include an electrical component that may provide means for providing, to a plurality of UEs, a bill of lading, indicating a list of titles that will be available from a broadcast transmission 810. For example, the means for providing the bill of lading 810 can include service module 710 of service provider system 700, communications module 750 of service provider system 700, and/or processor 730 of service provider system 700. In an aspect, the titles included in the bill of lading may be determined based on popular titles from a hypothetical title list associated with one or more UEs of the plurality of UEs. In such an aspect, the hypothetical play list may be generated from title access information received from at least a portion of the plurality of UEs, popularity of the titles among the plurality of UEs, etc.

Additionally, system 800 can include a memory 812 that retains instructions for executing functions associated with the electrical components 804, 806, 808, and 810, and stores data used or obtained by the electrical components 804, 806, 808, 810, etc. While shown as being external to memory 812 it is to be understood that one or more of the electrical components 804, 806, 808, and 810 may exist within memory 812. In one example, electrical components 804, 804, 806, 808, and 810 can include at least one processor, or each electrical component 804, 804, 806, 808, and 810 can be a corresponding module of at least one processor. Moreover, in an additional or alternative example, electrical components 804, 806, 808, and 810 may be a computer program product including a computer readable medium, where each electrical component 804, 806, 808, and 810 may be corresponding code.

Figure 9:
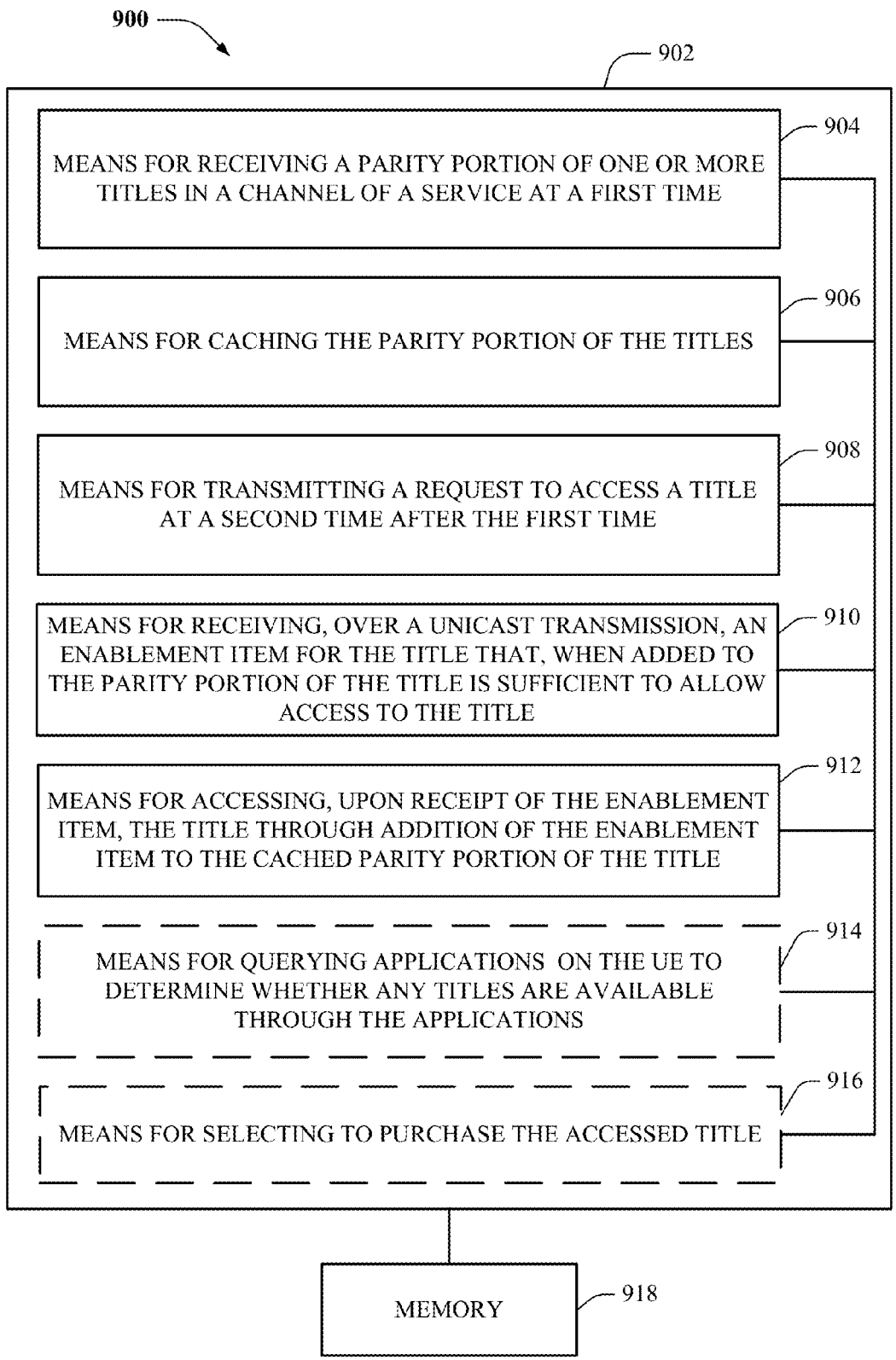
FIG. 9 depicts a block diagram of another example a communications device for facilitating hybrid unicast/broadcast service distribution, according to an aspect.

FIG. 9 depicts a block diagram of an exemplary communication system 900 operable to facilitate hybrid unicast/broadcast service distribution. For example, system 900 can reside at least partially within a communications device (e.g., a UE, a communications device 600). It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction.

For instance, logical grouping 902 can include an electrical component that may provide means for receiving a parity portion of one or more titles in a channel of a service at a first time 904. For example, the means for receiving a parity portion 904 can include receiver 602 of communications device 600, service access module 630 of communications device 600, and/or processor 606 of communications device 600. In an aspect, the channel may include one or more titles and the service may include one or more channels. In an aspect, the parity portion of the requested title may include a parity portion of a fountain code encoded title. In such an aspect, the fountain code may be a Raptor code (e.g., RaptorQ). In an aspect, the requested title may be formatted in segments for delivery using DASH), HLS, MSS, etc. In an aspect, the means for receiving the parity portion 904 may be configured to receive a bill of lading indicating a list of one or more titles that will be available from a broadcast transmission, determine that at least one of the one or more titles is not available on the UE, and receive the at least one of the one or more titles is not available on the UE using the broadcast transmission. In an aspect, the means for receiving the parity portion 904 may be configured to receive the parity portion of the one or more titles as part of a broadcast transmission, receive the parity portion of the one or more titles as part of a unicast transmission, or any combination thereof. In an aspect, the means for receiving the parity portion 904 may be configured to receive at least a time when the parity portion of the one or more titles associated with a service provider server generated hypothetical title list will be provided. In such an aspect, the means for receiving the parity portion 904 may be configured to receive the parity portion of the one or more titles from the service provider server generated hypothetical title list at the third time. In an aspect, the means for receiving the parity portion 904 may be configured to bind an advertisement content item to receive an advertisement content item that is bound to access of at least one title of the one or more titles. In an aspect, the means for receiving the parity portion 904 may be configured to determine that the UE has not previously received the parity portion of one or more titles, and biasing a reception mode toward use of one or more of a broadcast transmission mode, a Wireless local area network (WLAN) communication mode, a peer-to-peer communication mode, or any combination thereof over use of a cellular network unicast transmission mode. In such an aspect, system 900 may include a means for transmitting a message to the service provider server indicating at least one of the bias toward using the one or more reception broadcast transmission modes, or an identity of a communication mode that will be used. The means for transmitting the message may include a transmitter 620 of communications device 600.

Further, logical grouping 902 can include an electrical component that may provide means for caching the parity portion of the one or more titles 906. For example, the means for caching 906 can include memory 608 of communications device 600 and/or processor 606 of communications device 600. In an aspect, the means for caching 906 may be configured to cache the parity portion in a decode order. In an aspect, the means for caching 906 may be configured to use non-overlapping sets of repair symbols for at least one of: per a type of delivery, per a unicast transmission, per a broadcast push, or any combination thereof, to avoid duplicate symbol storage. In an aspect, the means for caching 906 may be configured to use non-overlapping symbol sets for multiple unicast connections for the same user to avoid duplicate symbol storage. In an aspect, the means for caching 906 may be configured to determine whether an allotment of memory is sufficient to store the parity portion of the one or more titles, and allocate additional memory for caching upon at determination that the allotment of memory is insufficient to store the parity portion of the one or more titles.

Further, logical grouping 902 can include an electrical component that may provide means for transmitting a request to access a title of the one or more titles at a second time after the first time 908. For example, the means for transmitting 908 can include transmitter 620 of communications device 600, service access module 630 of communications device 600, and/or processor 606 of communications device 600. In an aspect, the means for transmitting 908 may be configured to transmit, to a service provider server, title access information indicating which of the one or more titles have been accessed.

Further, logical grouping 902 can include an electrical component that may provide means for receiving, over a unicast transmission, an enablement item for the requested title 910. For example, the means for receiving an enablement item 910 can include receiver 602 of communications device 600, service access module 630 of communications device 600, and/or processor 606 of service provider system 600. In an aspect, the enablement item may be a portion of the requested title, which when processed with the previously provided parity portion of the requested title (and/or service, channel, etc.) may be sufficient to allow the UE to decode and access the requested title. In an aspect, the enablement item may be selected to allow a UE to decode a corresponding portion of the requested title prior to completion of playback of a previously requested title.

Further, logical grouping 902 can include an electrical component that may provide means for accessing, upon receipt of the enablement item, the requested title through addition of the enablement item to the cached parity portion of the requested title 912. For example, the means for receiving an enablement item 912 can include service access module 630 of communications device 600, and/or processor 606 of service provider system 600. In an aspect, the means for accessing 912 may be configured to access an advertisement content item prior to providing access to a requested title. In an aspect, the means for accessing 912 may be configured to access a first portion of the requested title, and decode a second portion of the requested title prior to completion of the access of the first portion. In such an aspect, a size of the enablement item may be selected to allow for the decoding a corresponding portion of the requested title prior to completion of accessing of the first portion of the requested title. In an aspect, the means for accessing 912 may be configured to bias title selection towards the one or more titles cached by the UE. In an optional aspect, the means for accessing 912 may be configured to accessing a title through at least one of the one or more applications.

In an optional aspect, logical grouping 902 can include an electrical component that may provide means for querying one or more applications operable on the UE to determine whether any titles are available through the one or more applications 914. For example, the means for querying 914 can include service access module 630 of communications device 600, and/or processor 606 of service provider system 600.

In another optional aspect, logical grouping 902 can include an electrical component that may provide means for selecting to purchase the accessed title 916. For example, the means for selecting 916 can include service access module 630 of communications device 600, and/or processor 606 of service provider system 600. In an aspect, the means for selecting 916 may be configured to provide the selected title for storage and access on the UE. In an aspect, the means for selecting 916 may be configured to determine that the accessed title has a quality of playback sufficient for purchase, and provide the accessed title for storage and access. In another aspect, the means for selecting 916 may be configured to determine that the accessed title does not have a quality of playback sufficient for purchase, and provide the accessed title for access and prompting the UE to subsequently access a purchase quality copy of the title at a later time.

Additionally, system 900 can include a memory 918 that retains instructions for executing functions associated with the electrical components 904, 906, 908, 910, 912, 914, and 916, and stores data used or obtained by the electrical components 904, 906, 908, 910, 912, 914, 916, etc. While shown as being external to memory 918 it is to be understood that one or more of the electrical components 904, 906, 908, 910, 912, 914, and 916 may exist within memory 918. In one example, electrical components 904, 906, 908, 910, 912, 914, and 916 can include at least one processor, or each electrical component 904, 906, 908, 910, 912, 914, and 916 can be a corresponding module of at least one processor. Moreover, in an additional or alternative example, electrical components 904, 906, 908, 910, 912, 914, and 916 may be a computer program product including a computer readable medium, where each electrical component 904, 906, 908, 910, 912, 914, and 916 may be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 602.11 (Wi-Fi), IEEE 602.16 (WiMAX), IEEE 602.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a non-transitory machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise non-transitory computer-readable media including RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications, comprising:
providing, to at least one user equipment (UE) of a plurality of UEs at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of the encoded symbols less than K;

receiving, from a UE of the plurality of UEs at a second time, a request to access a title of the one or more titles; and providing, to the requesting UE of the plurality of UEs, an enablement item, which is a portion of the requested title comprising additional encoded symbols that, when processed with the provided parity portion of the requested title, is sufficient to allow the requesting UE to decode and access the requested title.

2. The method of claim 1, wherein the parity portion of the requested title comprises a parity portion of a fountain code encoded title, and wherein the enablement item comprises one or more repair symbols that when added to the parity portion of the fountain code encoded title allow the requesting UE to decode the requested title.

3. The method of claim 2, wherein the requesting UE is configured to store the provided parity portion of the requested title in decode order.

4. The method of claim 2, wherein the fountain code encoded title is a Raptor code encoded title.

5. The method of claim 1, wherein the providing the parity portion of the one or more titles in the channel of the service further comprises:
   determining whether a level of interest in the title among the plurality of UEs is greater than a first threshold; and
   providing the parity portion of the title for a broadcast transmission upon a determination that the level of interest is greater than or equal to the first threshold among the plurality of UEs; or
   providing the parity portion of the title for a unicast transmission to any UEs of the plurality of UEs that have a level of interest in the title above the first threshold upon a determination that the level of interest is less than the first threshold among the plurality of UEs.

6. The method of claim 1, wherein the providing the parity portion of the one or more titles in the channel of the service further comprises:
   determining at least one of a network congestion value or a unicast connection throughput value; and
   providing the parity portion of the title for a unicast transmission when at least one of the network congestion value is below a first threshold value, the unicast connection throughput value is above a second threshold value, or any combination thereof.

7. The method of claim 1, wherein the providing the parity portion of the one or more titles in the channel of the service further comprises:
   receiving title access information from the at least a portion of the plurality of UEs;
   generating a hypothetical title list for at least one UE of the plurality of UEs;
   determining whether one or more titles in the hypothetical title list is not cached by the at least one UE; and
   providing at least a time to the at least one UE for when the parity portion of the one or more titles from the hypothetical title list that are not cached will be provided.

8. The method of claim 7, wherein the generating the hypothetical title list comprises at least one of:
   generating a list of titles within a channel of the one or more channels in the service; or
   generating a list of titles across multiple channels of the one or more channels in the service.

9. The method of claim 1, wherein at least one of providing the parity portion of the one or more titles or providing the enablement item further comprises:
   binding an advertisement content item to access of the requested title; and providing the advertisement content item to the requesting UE.

10. The method of claim 1, wherein at least one of providing the parity portion of the one or more titles or providing the enablement item further comprises:
   using at least one of a cellular network, a peer-to-peer connection, a wireless local area network (WLAN) connection, or any combination thereof, in which a broadcast mode and unicast mode of communications are available.

11. The method of claim 1, wherein providing the parity portion of one or more titles further comprises using at least one of:
   non-overlapping sets of repair symbols per a type of delivery to avoid duplicate symbol delivery;
   non-overlapping sets of repair symbols per a unicast transmission to avoid duplicate symbol delivery;
   non-overlapping sets of repair symbols per a broadcast push to avoid duplicate symbol delivery, or any combination thereof.

12. The method of claim 1, wherein providing the parity portion of one or more titles further comprises using non-overlapping symbol sets for multiple unicast connections for an individual user to avoid duplicate symbol delivery.

13. The method of claim 1, wherein the requested title is formatted in segments for delivery using dynamic adaptive streaming over HTTP (DASH), HTTP live streaming (HLS), or mobile streaming service (MSS), and wherein the requesting UE is configured to organize memory blocks in a UE cache to correspond to the formatted segments.

14. The method of claim 1, further comprising:
   providing a bill of lading indicating a list of one or more titles that will be available from a broadcast transmission prior to providing the parity portion of the one or more titles.

15. The method of claim 1, wherein the enablement item is selected to allow the requesting UE to decode a corresponding portion of the requested title prior to completion of playback of a previous title.

16. The method of claim 1, wherein providing the parity portion of one or more titles further comprises:
   determining whether an allotment of memory in a first UE of the plurality of UEs is sufficient to store the parity portion of the one or more titles; and
   prompting the first UE of the plurality of UEs to allocate additional memory for caching upon at determination that the allotment of memory is insufficient to store the parity portion of the one or more titles.

17. The method of claim 1, wherein the providing the parity portion, the providing the enablement item, and the receiving are performed by a service provider server.

18. A method of communications, comprising:
   receiving, by a user equipment (UE) at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of encoded symbols less than K;
   caching the parity portion of the one or more titles;
   transmitting a request to access a title of the one or more titles at a second time after the first time;
   receiving, over a unicast transmission, an enablement item for the requested title, wherein the enablement item is a portion of the requested title comprising additional encoded symbols that, when processed with the provided parity portion of the requested title, is sufficient to allow the UE to decode and access the requested title; and accessing, upon receipt of the enablement item, the requested title through addition of the enablement item to the cached parity portion of the requested title.

19. The method of claim 18, wherein the receiving the parity portion of the one or more titles further comprises:

receiving a bill of lading indicating a list of one or more titles that will be available from a broadcast transmission;

determining that at least one of the one or more titles is not available on the UE; and receiving the at least one of the one or more titles is not available on the UE using the broadcast transmission.

20. The method of claim 18, wherein the parity portion of the one or more titles comprises a parity portion of a fountain code encoded title, and wherein the enablement item comprises one or more repair symbols that when added to the parity portion of the fountain code encoded title allow the UE to decode at least a portion of the requested title.

21. The method of claim 20, wherein the fountain code encoded title is a Raptor code encoded title.

22. The method of claim 18, wherein the caching further comprises caching in a decode order.

23. The method of claim 18, wherein the caching further comprises using at least one of:

non-overlapping sets of repair symbols per a type of delivery to avoid duplicate symbol storage;

non-overlapping sets of repair symbols per a unicast transmission to avoid duplicate symbol storage;

non-overlapping sets of repair symbols per a broadcast push to avoid duplicate symbol storage, or any combination thereof.

24. The method of claim 18, wherein the caching further comprises using non-overlapping symbol sets for multiple unicast connections for the same user to avoid duplicate symbol storage.

25. The method of claim 18, wherein the receiving the parity portion of the one or more titles in the channel of the service further comprises at least one of:

receiving the parity portion of the one or more titles as part of a broadcast transmission;

receiving the parity portion of the one or more titles as part of a unicast transmission, or any combination thereof.

26. The method of claim 18, wherein the transmitting further comprises:

transmitting, to a service provider server, title access information indicating which of the one or more titles have been accessed; and wherein the receiving the parity portion further comprises receiving at least a third time when the parity portion of the one or more titles associated with a service provider server generated hypothetical title list will be provided.

27. The method of claim 26, wherein the receiving the parity portion further comprises:

receiving the parity portion of the one or more titles from the service provider server generated hypothetical title list at the third time.

28. The method of claim 18, wherein at least one of the receiving the parity portion of the one or more titles or receiving the enablement item further comprises:

receiving an advertisement content item that is bound to access of at least one title of the one or more titles; and
accessing the advertisement content item prior to providing access to the at least one title of the one or more titles.

29. The method of claim 18, wherein the accessing further comprises:

accessing a first portion of the requested title; and
decoding a second portion of the requested title prior to completion of the access of the first portion, wherein a size of the enablement item is selected to allow for the decoding a corresponding portion of the requested title prior to completion of accessing of the first portion of the requested title.

30. The method of claim 18, wherein the caching further comprises:

determining whether an allotment of memory is sufficient to store the parity portion of the one or more titles; and
allocating additional memory for caching upon at determination that the allotment of memory is insufficient to store the parity portion of the one or more titles.

31. The method of claim 18, wherein the accessing further comprises biasing title selection towards the one or more titles cached by the UE.

32. The method of claim 18, further comprising:

querying one or more applications operable on the UE to determine whether any titles are available through the one or more applications; and
wherein the accessing further comprises accessing the requested title through at least one of the one or more applications.

33. The method of claim 18, further comprising:

selecting to purchase the accessed title; and
providing the selected title for storage and access on the UE.

34. The method of claim 33, wherein the providing the selected title for storage and access on the UE further comprises:

determining whether the accessed title has a quality of playback sufficient for purchase; and
providing the accessed title for storage and access upon a determination that the quality of playback is sufficient for purchase; or
providing the accessed title for access and prompting the UE to subsequently access a purchase quality copy of the title at a later time upon a determination that the quality of playback is insufficient for purchase.

35. The method of claim 18, wherein the receiving the parity portion of one or more titles in the channel of the service further comprises:

determining that the UE has not previously received the parity portion of one or more titles; and
biasing a reception mode toward use of one or more of a broadcast transmission mode, a Wireless local area network (WLAN) communication mode, a peer-to-peer communication mode, or any combination thereof over use of a cellular network unicast transmission mode.

36. The method of claim 35, further comprising:

transmitting a message to a service provider server indicating at least one bias toward using the one or more broadcast transmission modes, or an identity of a communication mode that will be used.

37. An apparatus for communications, comprising:

means for providing, to at least one user equipment (UE) of a plurality of UEs at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of the encoded symbols less than K;

means for receiving, from a UE of the plurality of UEs at a second time, a request to access a title of the one or more titles; and means for providing, to the requesting UE of the plurality of UEs, an enablement item, which is a portion of the requested title comprising additional encoded symbols that, when processed with the provided parity portion of the requested title, is sufficient to allow the UE to decode and access the title.

38. The apparatus of claim 37, wherein the means for providing the parity portion is further configured to:

determine whether a level of interest in the title among the plurality of UEs is greater than a first threshold; and provide the parity portion of the title for a broadcast transmission upon a determination that the level of interest is greater than or equal to the first threshold among the plurality of UEs; or provide the parity portion of the title for a unicast transmission to any UEs of the plurality of UEs that have a level of interest in the title above the first threshold upon a determination that the level of interest is less than the first threshold among the plurality of UEs.

39. An apparatus for communications, comprising:

means for receiving, by a user equipment (UE) at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of encoded symbols less than K;

means for caching the parity portion of the one or more titles;

means for transmitting a request to access a title of the one or more titles at a second time after the first time;

means for receiving, over a unicast transmission, an enablement item for the title, wherein the enablement item is a portion of the requested title comprising additional encoded symbols that, when processed with the provided parity portion of the requested title, is sufficient to allow the UE to decode and access the requested title; and means for accessing, upon receipt of the enablement item, the requested title through addition of the enablement item to the cached parity portion of the requested title.

40. The apparatus of claim 39, wherein the means for receiving the parity portion is configured to:

receive the parity portion of the one or more titles as part of a broadcast transmission;

receive the parity portion of the one or more titles as part of a unicast transmission, or any combination thereof.

41. A non-transitory computer-readable medium having stored thereon processor-executable instructions configured to cause a processor to perform operations comprising:

providing, to at least one user equipment (UE) of a plurality of UEs at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of the encoded symbols less than K;

receiving, from a UE of the plurality of UEs at a second time, a request to access a title of the one or more titles; and providing, to the requesting UE of the plurality of UEs, an enablement item, which is a portion of the requested title comprising additional encoded symbols that, when processed with the provided parity portion of the requested title, is sufficient to allow the requesting UE to decode and access the requested title.

42. A non-transitory computer-readable medium having stored thereon processor-executable instructions configured to cause a processor to perform operations comprising:

receiving, by a user equipment (UE) at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of encoded symbols less than K;

caching the parity portion of the one or more titles;

transmitting a request to access a title of the one or more titles at a second time after the first time;

receiving, over a unicast transmission, an enablement item for the title, wherein the enablement item is a portion of the requested title comprising additional encoded symbols that, when processed with the provided parity portion of the requested title, is sufficient to allow the UE to decode and access the requested title; and accessing, upon receipt of the enablement item, the requested title through addition of the enablement item to the cached parity portion of the requested title.

43. An apparatus for communications, comprising:

a processing system configured with processor-executable software instructions to:

provide, to at least one user equipment (UE) of a plurality of UEs at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of the encoded symbols less than K;

receive, from a UE of the plurality of UEs at a second time, a request to access a title of the one or more titles; and provide, to the requesting UE of the plurality of UEs, an enablement item, which is a portion of the requested title comprising additional encoded symbols that, when processed with the provided parity portion of the requested title, is sufficient to allow the requesting UE to decode and access the requested title.

44. The apparatus of claim 43, wherein the parity portion of the requested title comprises a parity portion of a fountain code encoded title, and wherein the enablement item comprises one or more repair symbols that when added to the parity portion of the fountain code encoded title allow the requesting UE to decode the requested title.

45. The apparatus of claim 44, wherein the requesting UE is configured to store the provided parity portion of the requested title in decode order.

46. The apparatus of claim 44, wherein the fountain code encoded title is a Raptor code encoded title.

47. The apparatus of claim 43, wherein the processing system is further configured with processor-executable software instructions to:
determine whether a level of interest in the title among the plurality of UEs is greater than a first threshold; and
provide the parity portion of the title for a broadcast transmission upon a determination that the level of interest is greater than or equal to the first threshold among the plurality of UEs; or
provide the parity portion of the title for a unicast transmission to any UEs of the plurality of UEs that have a level of interest in the title above the first threshold upon a determination that the level of interest is less than the first threshold among the plurality of UEs.

48. The apparatus of claim 43, wherein the processing system is further configured with processor-executable software instructions to:
determine at least one of a network congestion value or a unicast connection throughput value; and
provide the parity portion of the title for a unicast transmission when at least one of the network congestion value is below a first threshold value, the unicast connection throughput value is above a second threshold value, or any combination thereof.

49. The apparatus of claim 43, wherein the processing system is further configured with processor-executable software instructions to:
receive title access information from the at least a portion of the plurality of UEs;
generate a hypothetical title list for at least one UE of the plurality of UEs;
determine whether one or more titles in the hypothetical title list is not cached by the at least one UE; and
provide at least a time to the at least one UE for when the parity portion of the one or more titles from the hypothetical title list that are not cached will be provided.

50. The apparatus of claim 49, wherein the processing system is further configured with processor-executable software instructions to:
generate a list of titles within a channel of the one or more channels in the service; or
generate a list of titles across multiple channels of the one or more channels in the service.

51. The apparatus of claim 43, wherein the processing system is further configured with processor-executable software instructions to:
bind an advertisement content item to access of the requested title; and
provide the advertisement content item to the requesting UE.

52. The apparatus of claim 43, wherein the processing system is further configured with processor-executable software instructions to:
use at least one of a cellular network, a peer-to-peer connection, a wireless local area network (WLAN) connection, or any combination thereof, in which a broadcast mode and unicast mode of communications are available.

53. The apparatus of claim 43, wherein the processing system is further configured with processor-executable software instructions to use at least one of:
non-overlapping sets of repair symbols per a type of delivery to avoid duplicate symbol delivery;
non-overlapping sets of repair symbols per a unicast transmission to avoid duplicate symbol delivery;
non-overlapping sets of repair symbols per a broadcast push to avoid duplicate symbol delivery, or any combination thereof.

54. The apparatus of claim 43, wherein the processing system is further configured with processor-executable software instructions to use non-overlapping symbol sets for multiple unicast connections for the an individual user to avoid duplicate symbol delivery.

55. The apparatus of claim 43, wherein the requested title is formatted in segments for delivery using dynamic adaptive streaming over HTTP (DASH), HTTP live streaming (HLS), or mobile streaming service (MSS), and wherein the requesting UE is configured to organize memory blocks in a UE cache to correspond to the formatted segments.

56. The apparatus of claim 43, wherein the processing system is further configured with processor-executable software instructions to:
provide a bill of lading indicating a list of one or more titles that will be available from a broadcast transmission prior to providing the parity portion of the one or more titles.

57. The apparatus of claim 43, wherein the enablement item is selected to allow the requesting UE to decode a corresponding portion of the requested title prior to completion of playback of a previous title.

58. The apparatus of claim 43, wherein the processing system is further configured with processor-executable software instructions to:
determine whether an allotment of memory in a first UE of the plurality of UEs is sufficient to store the parity portion of the one or more titles; and
prompt the first UE of the plurality of UEs to allocate additional memory for caching upon at determination that the allotment of memory is insufficient to store the parity portion of the one or more titles.

59. The apparatus of claim 43, wherein the apparatus is a service provider server.

60. An apparatus for communications including a user equipment (UE), comprising:
a processing system configured with processor-executable software instructions to:
receive, at a first time, a parity portion of one or more titles in a channel of a service, wherein the channel includes one or more titles and the service includes one or more channels, wherein the one or more titles are encoded with a code having a property that source symbols can be recovered from any subset of encoded symbols of size equal to or larger than a number of source symbols, K, wherein the parity portion comprises a subset of encoded symbols less than K;
cache the parity portion of the one or more titles;
transmit a request to access a title of the one or more titles at a second time after the first time;
receive, over a unicast transmission, an enablement item for the requested title, wherein the enablement item is a portion of the requested title comprising additional encoded symbols that, when processed with the provided parity portion of the requested title, is sufficient to allow the UE to decode and access the requested title; and
access, upon receipt of the enablement item, the requested title through addition of the enablement item to the cached parity portion of the requested title.

61. The apparatus of claim 60, wherein the processing system is further configured with processor-executable software instructions to:
receive a bill of lading indicating a list of one or more titles that will be available from a broadcast transmission;

determine that at least one of the one or more titles is not available on the UE; and receive the at least one of the one or more titles is not available on the UE using the broadcast transmission.

62. The apparatus of claim 60, wherein the parity portion of the one or more titles comprises a parity portion of a fountain code encoded title, and wherein the enablement item comprises one or more repair symbols that when added to the parity portion of the fountain code encoded title allow the UE to decode at least a portion of the requested title.

63. The apparatus of claim 62, wherein the fountain code encoded title is a Raptor code encoded title.

64. The apparatus of claim 60, wherein the processing system is further configured with processor-executable software instructions to cache in a decode order.

65. The apparatus of claim 60, wherein the processing system is further configured with processor-executable software instructions to use at least one of:

non-overlapping sets of repair symbols per a type of delivery to avoid duplicate symbol storage;

non-overlapping sets of repair symbols per a unicast transmission to avoid duplicate symbol storage;

non-overlapping sets of repair symbols per a broadcast push to avoid duplicate symbol storage, or any combination thereof.

66. The apparatus of claim 60, wherein the processing system is further configured with processor-executable software instructions to use non-overlapping symbol sets for multiple unicast connections for the same user to avoid duplicate symbol storage.

67. The apparatus of claim 60, wherein the processing system is further configured with processor-executable software instructions to:

receive the parity portion of the one or more titles as part of a broadcast transmission;

receive the parity portion of the one or more titles as part of a unicast transmission, or any combination thereof.

68. The apparatus of claim 60, wherein the processing system is further configured with processor-executable software instructions to:

transmit, to a service provider server, title access information indicating which of the one or more titles have been accessed; and receive at least a third time when the parity portion of the one or more titles associated with a service provider server generated hypothetical title list will be provided.

69. The apparatus of claim 68, wherein the processing system is further configured with processor-executable software instructions to:

receive the parity portion of the one or more titles from the service provider server generated hypothetical title list at the third time.

70. The apparatus of claim 60, wherein the processing system is further configured with processor-executable software instructions to:

receive an advertisement content item that is bound to access of at least one title of the one or more titles; and access the advertisement content item prior to providing access to the at least one title of the one or more titles.

71. The apparatus of claim 60, wherein the processing system is further configured with processor-executable software instructions to:

access a first portion of the requested title; and decode a second portion of the requested title prior to completion of the access of the first portion, wherein a size of the enablement item is selected to allow for the decoding a corresponding portion of the requested title prior to completion of accessing of the first portion of the requested title.

72. The apparatus of claim 60, wherein the processing system is further configured with processor-executable software instructions to:

determine whether an allotment of memory is sufficient to store the parity portion of the one or more titles; and allocate additional memory for caching upon at determination that the allotment of memory is insufficient to store the parity portion of the one or more titles.

73. The apparatus of claim 60, wherein the processing system is further configured with processor-executable software instructions to bias title selection towards the one or more titles cached by the UE.

74. The apparatus of claim 60, wherein the processing system is further configured with processor-executable software instructions to:

query one or more applications operable on the UE to determine whether any titles are available through the one or more applications; and access a title through at least one of the one or more applications.

75. The apparatus of claim 60, wherein the processing system is further configured with processor-executable software instructions to:

select to purchase the accessed title; and provide the selected title for storage and access on the UE.

76. The apparatus of claim 75, wherein the processing system is further configured with processor-executable software instructions to:

determine whether the accessed title has a quality of playback sufficient for purchase; and provide the accessed title for storage and access upon a determination that the quality of playback is sufficient for purchase; or provide the accessed title for access and prompting the UE to subsequently access a purchase quality copy of the title at a later time upon a determination that the quality of playback is insufficient for purchase.

77. The apparatus of claim 60, wherein the processing system is further configured with processor-executable software instructions to:

determine that the UE has not previously received the parity portion of one or more titles; and bias a reception mode toward use of one or more of a broadcast transmission mode, a Wireless local area network (WLAN) communication mode, a peer-to-peer communication mode, or any combination thereof over use of a cellular network unicast transmission mode.

78. The apparatus of claim 77, wherein the processing system is further configured with processor-executable software instructions to:

transmit a message to a service provider server indicating at least one bias toward using the one or more broadcast transmission modes, or an identity of a communication mode that will be used.

* * * * *